(12) United States Patent
Zheng et al.

(10) Patent No.: US 12,333,202 B2
(45) Date of Patent: Jun. 17, 2025

(54) FOLDABLE SCREEN DISPLAY METHOD AND ELECTRONIC DEVICE

(71) Applicant: Huawei Technologies Co., Ltd., Shenzhen (CN)

(72) Inventors: Jiangzhen Zheng, Nanjing (CN); Zongbo Wang, Nanjing (CN); Xueyan Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/695,517

(22) Filed: Mar. 15, 2022

(65) Prior Publication Data
US 2022/0197584 A1 Jun. 23, 2022

Related U.S. Application Data

(63) Continuation of application No. PCT/CN2020/114976, filed on Sep. 14, 2020.

(30) Foreign Application Priority Data

Sep. 16, 2019 (CN) .......................... 201910870242.9

(51) Int. Cl.
*G06F 3/14* (2006.01)
*G06F 1/16* (2006.01)
(Continued)

(52) U.S. Cl.
CPC .......... *G06F 3/1446* (2013.01); *G06F 1/1641* (2013.01); *G06F 3/04817* (2013.01);
(Continued)

(58) Field of Classification Search
CPC .. G06F 3/1446; G06F 1/1641; G06F 3/04817; G06F 3/04886; G06T 13/80
See application file for complete search history.

(56) References Cited

U.S. PATENT DOCUMENTS

D926,219 S * 7/2021 Yoo .............................. D14/488
2014/0137041 A1 5/2014 Jeon et al.
(Continued)

FOREIGN PATENT DOCUMENTS

CN 107809504 A 3/2018
CN 107979667 A 5/2018
(Continued)

*Primary Examiner* — David E Choi
(74) *Attorney, Agent, or Firm* — Leydig, Voit & Mayer, Ltd.

(57) ABSTRACT

A foldable screen display method and an electronic device are disclosed, to achieve better user experience when a displayable area of an electronic device with a foldable screen changes. A specific solution includes: when an electronic device is in a folded state, displaying a first interface on a main screen of the electronic device, where the first interface is a main interface of the electronic device, and the first interface includes one or more application icons; and in response to a change of the electronic device from the folded state to an unfolded state, displaying, by the electronic device, the first interface in a first display region of the foldable screen, and displaying a second interface in a second display region of the foldable screen, where the second interface is different from the first interface.

14 Claims, 30 Drawing Sheets

(51) Int. Cl.
*G06F 3/04817* (2022.01)
*G06F 3/04886* (2022.01)
*G06T 13/80* (2011.01)

(52) U.S. Cl.
CPC .......... *G06F 3/04886* (2013.01); *G06T 13/80* (2013.01); *G06F 1/1652* (2013.01); *G06F 2203/04803* (2013.01)

(56) References Cited

U.S. PATENT DOCUMENTS

| | | | |
|---|---|---|---|
| 2015/0153929 A1* | 6/2015 | Bernstein | G06F 3/04883 715/781 |
| 2015/0227224 A1 | 8/2015 | Park et al. | |
| 2015/0242070 A1 | 8/2015 | Sirpal et al. | |
| 2015/0309691 A1 | 10/2015 | Seo et al. | |
| 2015/0370425 A1* | 12/2015 | Chen | G06F 3/04817 715/830 |
| 2016/0034047 A1 | 2/2016 | Lee et al. | |
| 2016/0041719 A1 | 2/2016 | Wang et al. | |
| 2016/0132074 A1 | 5/2016 | Kim et al. | |
| 2016/0147362 A1 | 5/2016 | Eim et al. | |
| 2016/0381014 A1* | 12/2016 | Kim | G06F 1/1652 726/7 |
| 2018/0121056 A1 | 5/2018 | Kyoya et al. | |
| 2018/0374411 A1* | 12/2018 | Yang | G06F 3/0488 |
| 2020/0249898 A1* | 8/2020 | Ko | G06F 3/04886 |
| 2020/0320906 A1* | 10/2020 | Knarr | G06F 1/1643 |
| 2020/0371685 A1* | 11/2020 | Wang | G06F 3/04845 |
| 2020/0401190 A1 | 12/2020 | Sim et al. | |
| 2021/0096675 A1* | 4/2021 | Klein | G06F 1/162 |
| 2021/0216332 A1* | 7/2021 | Li | G06F 1/1641 |
| 2022/0050582 A1* | 2/2022 | Zhou | G06F 3/0485 |
| 2022/0321691 A1* | 10/2022 | Yao | H04M 1/72436 |

FOREIGN PATENT DOCUMENTS

| | | |
|---|---|---|
| CN | 110032318 A | 7/2019 |
| CN | 110045936 A | 7/2019 |
| CN | 110069228 A | 7/2019 |
| CN | 110109601 A | 8/2019 |
| CN | 110147192 A | 8/2019 |
| CN | 110286972 A | 9/2019 |
| JP | 2019067346 A | 4/2019 |
| WO | 2012144632 A1 | 10/2012 |
| WO | 2013175751 A1 | 11/2013 |
| WO | 2018034427 A1 | 2/2018 |
| WO | 2018191900 A1 | 10/2018 |

* cited by examiner

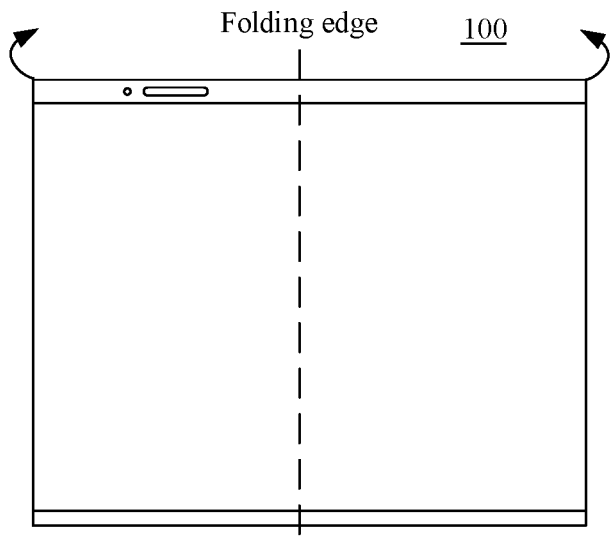
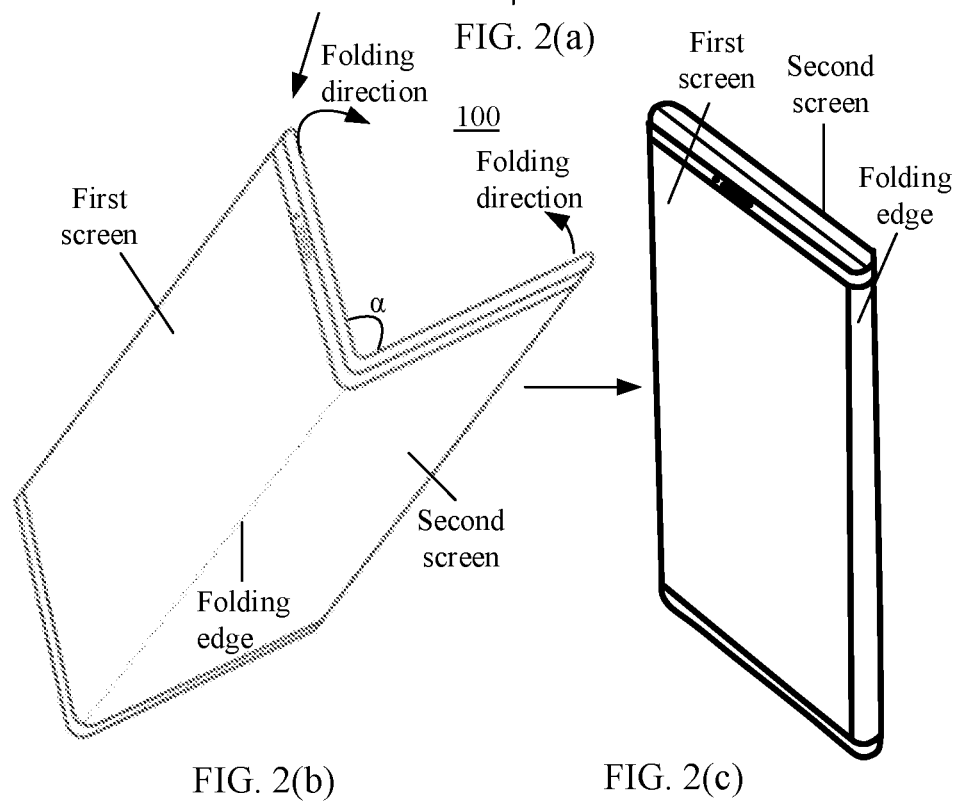
FIG. 2(a)
FIG. 2(b)  FIG. 2(c)

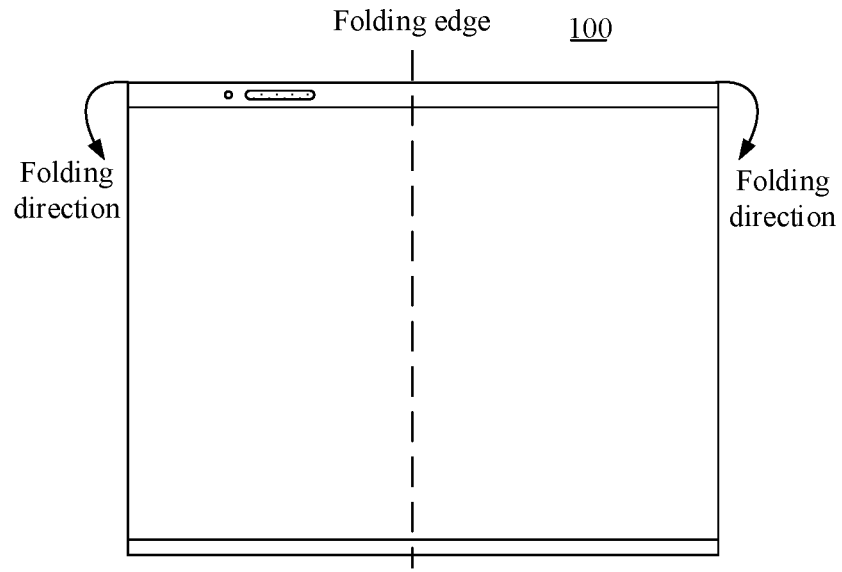
FIG. 3(a)
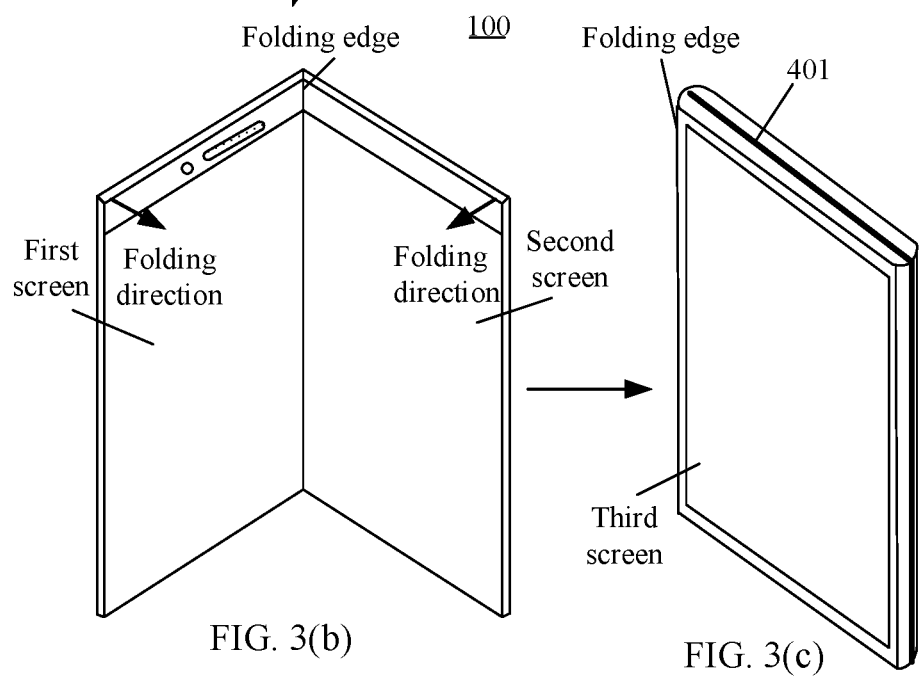
FIG. 3(b)
FIG. 3(c)

FOLDABLE SCREEN DISPLAY METHOD AND ELECTRONIC DEVICE

CROSS-REFERENCE TO RELATED APPLICATIONS

This application is a continuation of International Application No. PCT/CN2020/114976, filed on Sep. 14, 2020, which claims priority to Chinese Patent Application No. 201910870242.9, filed on Sep. 16, 2019. The disclosures of the aforementioned applications are hereby incorporated by reference in their entireties.

TECHNICAL FIELD

Embodiments of this application relate to the field of computer technologies, and in particular, to a foldable screen display method and an electronic device.

BACKGROUND

User interface (UI) adaptation means that an interface element on a display of a terminal changes with a change of a screen size or resolution. For example, if a width of the screen increases, a value of a distance between interface elements increases adaptively. If an aspect ratio of the display changes, a quantity of application icons displayed in each row or each column on the device also changes. For example, for landscape-mode display and portrait-mode display on a tablet computer, a quantity of application icons in each row in the landscape-mode display is different from that in the portrait-mode display.

A mobile phone with a foldable screen has been proposed in recent years. The foldable screen can be folded into at least two screens. After the foldable screen is folded, an application interface may be displayed on one screen. After the foldable screen is unfolded, a screen area increases. During display on the conventional foldable screen, content displayed on the mobile phone remains unchanged before and after the foldable screen is folded. FIG. 1(a) shows an interface displayed after the mobile phone with the foldable screen is folded, and FIG. 1(b) shows an interface displayed after the mobile phone with the foldable screen is unfolded. FIG. 1(b) shows an example of interface display in which a value of a distance between application icons is adaptively adjusted after an aspect ratio of the screen changes.

In the foregoing display mode, a value of a distance between application icons on a display interface is adaptively adjusted to adapt to a change of a screen size. As a result, the application icons on the display interface are not arranged compactly, causing bad impression to a user. If a quantity of application icons on the display interface is changed, a display order of the original application icons on the display interface is also changed. When viewing the display interface, a user needs to search for and locate an application icon again, causing inconvenience to the user.

SUMMARY

Embodiments of this application provide a foldable screen display method and an electronic device, to adaptively adjust a location of an application icon on a display interface when a screen area of an electronic device with a foldable screen changes, without changing an original application icon arrangement order, so that a user has better impression.

The following describes embodiments of this application.

According to a first aspect, an embodiment of this application provides a foldable screen display method. The method may be applied to an electronic device including a foldable screen. The electronic device may be folded so that the foldable screen is divided into a plurality of display regions. The method may include: when the electronic device is in a folded state, displaying a first interface on a main screen of the electronic device, where the first interface is a main interface of the electronic device, and the first interface includes one or more application icons; and in response to a change of the electronic device from the folded state to an unfolded state, displaying, by the electronic device, the first interface in a first display region of the foldable screen, and displaying a second interface in a second display region of the foldable screen, where the second interface is different from the first interface.

It should be noted that, when the electronic device with the foldable screen is in the folded state, the foldable screen is divided into the plurality of display regions due to a physical shape change, and a region currently used for displaying is the main screen. For an outward foldable screen, the main screen is a part of the foldable screen. For an inward foldable screen, the main screen is another display on the electronic device. The main screen of the electronic device may include one or more main interfaces, and the one or more main interfaces may be used to display application icons and folder icons on the electronic device.

In this embodiment of this application, after the electronic device with the foldable screen is unfolded, different interfaces are displayed in the first display region and the second display region, and the first interface displayed in the first display region is the main interface displayed when the electronic device is in the folded state. In this case, after the electronic device changes from the folded state to the unfolded state, content displayed on the first interface remains unchanged, so that a user can operate the electronic device according to an original operation habit. This brings convenience for the user to use the electronic device. When the electronic device is in the unfolded state, an area of the foldable screen increases. In this case, the first interface is displayed in the first display region, and the second interface is displayed in the second display region. The first interface is different from the second interface. Therefore, more operation options are provided for the user. This improves user experience.

It should be noted that, in this application, after the electronic device changes from the folded state to the unfolded state, the first interface displayed when the electronic device is in the folded state is still displayed in the first display region of the foldable screen. However, this is not intended to set a limitation that the first interface does not change at all before and after a state of the electronic device changes. Alternatively, the first interface may change without affecting the operation habit of the user. For example, a background is adjusted to be the same as that of the second interface, or a background color changes, or more function options are displayed on the top or at the bottom of the first interface, or as shown in FIG. 11A, the first interface changes because other applications are displayed on a complete display interface in the unfolded state.

With reference to the first aspect, in a possible implementation, the second interface includes one or more second application icons, and the one or more second application icons include an application icon of an application that has recently been run on the electronic device and that has not been closed.

The second application icon on the second interface is an application icon of an application that has recently been run on the electronic device and that has not been closed. In this way, the electronic device in the unfolded state can provide more operation options for the user. In addition, the user can learn of a recently run application based on content displayed on the electronic device. This further improves user experience.

With reference to the first aspect, in a possible implementation, the second interface includes one or more second application icons, and the one or more second application icons include an application icon of one or more applications that have been used more than a preset quantity of times within a preset period of time, or an application icon of one or more applications that have been used longer than preset duration within a preset period of time.

The second application icons included in the second interface are application icons corresponding to an application that have been used on the electronic device a large quantity of times or that have been used on the electronic device for a long period of time. The applications may be understood as applications frequently used by the user. Application icons corresponding to the applications are displayed on the second interface, so that the user can more quickly determine an application that the user wants to use. This improves user experience.

With reference to the first aspect, in a possible implementation, the second interface is an interface of a recently used application.

With reference to the first aspect, in a possible implementation, the second interface is a leftmost screen.

With reference to the first aspect, in a possible implementation, content included in the second interface is user-defined.

With reference to the first aspect, in a possible implementation, the second interface includes one or more second application icons, and the second interface is another main interface of the electronic device.

The second interface is another main interface of the electronic device, so that the electronic device in the unfolded state displays two main interfaces. An arrangement manner and an arrangement order of application icons on the two main interfaces do not change, and the user does not need to learn of a location of each application icon again. In this case, the user may determine a location of an application icon according to an original operation habit. This further improves user experience.

With reference to the first aspect, in a possible implementation, when the electronic device is in the folded state, a first page control is displayed on the main screen of the electronic device. The first page control is used to indicate that the electronic device is currently displaying one main interface of the electronic device. When the electronic device is in the unfolded state, a second page control is displayed on the foldable screen. The second page control is used to indicate that the electronic device is currently displaying two main interfaces of the electronic device.

The first page control is used to indicate the main interface of the electronic device. A main interface displayed on the electronic device in the unfolded state is the same as that displayed on the electronic device in the folded state. In this case, the user does not need to learn of or memorize main interfaces in different states. This improves user impression and experience.

With reference to the first aspect, in a possible implementation, when the electronic device is in the unfolded state, in response to a first swiping operation, the electronic device displays the second interface in the first display region, and displays a third interface in the second display region. The third interface is different from the second interface. The third interface is another main interface of the electronic device, or the third interface is a leftmost screen of the electronic device.

It should be noted that the leftmost screen (negative interface/HiBoard) of the electronic device is an interface accessed by the user by swiping right from a display desktop (or the main interface) of the electronic device. The interface may display a function and an application that are frequently used by the user, a service and information that the user subscribes to, and the like. The leftmost screen may also be referred to as a desktop assistant, a shortcut menu, or the like.

With reference to the first aspect, in a possible implementation, the foldable screen is an inward foldable screen. When the electronic device is in the folded state, the foldable screen is invisible to the user. When the electronic device is in the unfolded state, the foldable screen is visible to the user. The foldable screen display method further includes: In a process in which the electronic device changes from the folded state to the unfolded state, the electronic device displays, in the first display region, animations in which a plurality of first application icons appear column by column, and displays, in the second display region, animations in which the one or more second application icons appear column by column.

In a process in which the electronic device changes from the unfolded state to the folded state, the electronic device displays, in the first display region, animations in which the plurality of first application icons disappear column by column, and displays, in the second display region, animations in which the one or more second application icons disappear column by column.

With reference to the first aspect, in a possible implementation, the foldable screen is an outward foldable screen. When the electronic device is in the folded state or the unfolded state, the foldable screen is visible to the user. The foldable screen display method further includes: In a process in which the electronic device changes from the folded state to the unfolded state, the electronic device displays, in the second display region, animations in which the one or more second application icons appear column by column.

In a process in which the electronic device changes from the unfolded state to the folded state, the electronic device displays, in the second display region, animations in which the one or more second application icons disappear column by column.

When a state of the electronic device changes, the foldable screen displays an icon by using animations. This improves user impression.

According to a second aspect, an embodiment of this application provides an electronic device. The electronic device includes a foldable screen, a memory, and one or more processors. The foldable screen, the memory, and the processor are coupled to each other. The memory is configured to store computer program code. The computer program code includes computer instructions. When the processor executes the computer instructions, the electronic device is enabled to further perform the following steps: when the electronic device is in a folded state, displaying a first interface on a main screen, where the first interface is a main interface of the electronic device, and the first interface includes a plurality of first application icons; and in response to a change of the electronic device from the folded state to an unfolded state, displaying the first interface in a first display region of the foldable screen, and displaying a second interface in a second display region of the foldable screen, where the second interface is different from the first interface.

With reference to the second aspect, in a possible implementation, when the processor executes the computer instructions, the electronic device is enabled to further perform the following steps: when the electronic device is in the folded state, displaying a first page control on the main screen, where the first page control is used to indicate that the electronic device is currently displaying one main interface of the electronic device; and when the electronic device is in the unfolded state, displaying a second page control on the foldable screen, where the second page control is used to indicate that the electronic device is currently displaying two main interfaces of the electronic device.

With reference to the second aspect, in a possible implementation, when the processor executes the computer instructions, the electronic device is enabled to further perform the following steps: when the electronic device is in the unfolded state, in response to a first swiping operation, displaying the second interface in the first display region, and displaying a third interface in the second display region, where the third interface is different from the second interface, and the third interface is another main interface of the electronic device, or the third interface is a leftmost screen of the electronic device.

With reference to the second aspect, in a possible implementation, the foldable screen is an inward foldable screen. When the electronic device is in the folded state, the foldable screen is invisible to a user. When the electronic device is in the unfolded state, the foldable screen is visible to the user. When the processor executes the computer instructions, the electronic device is enabled to further perform the following steps: in a process in which the electronic device changes from the folded state to the unfolded state, displaying, in the first display region, animations in which the plurality of first application icons appear column by column, and displaying, in the second display region, animations in which the one or more second application icons appear column by column; and in a process in which the electronic device changes from the unfolded state to the folded state, displaying, in the first display region, animations in which the plurality of first application icons disappear column by column, and displaying, in the second display region, animations in which the one or more second application icons disappear column by column.

With reference to the second aspect, in a possible implementation, the foldable screen is an outward foldable screen. When the electronic device is in the folded state or the unfolded state, the foldable screen is visible to a user. When the processor executes the computer instructions, the electronic device is enabled to further perform the following steps: In a process in which the electronic device changes from the folded state to the unfolded state, the electronic device displays, in the second display region, animations in which the one or more second application icons appear column by column. In a process in which the electronic device changes from the unfolded state to the folded state, the electronic device displays, in the second display region, animations in which the one or more second application icons disappear column by column.

According to a third aspect, an embodiment of this application provides a chip system. The chip system is used for the foregoing electronic device including a touchscreen. The chip system includes one or more interface circuits and one or more processors. The interface circuit and the processor are connected to each other through a line. The interface circuit is configured to receive a signal from a memory of the electronic device, and send the signal to the processor. The signal includes computer instructions stored in the memory. When the processor executes the computer instructions, the electronic device performs the method according to any one of the first aspect or the possible implementations of the first aspect.

According to a fourth aspect, an embodiment of this application provides a computer storage medium. The computer storage medium includes computer instructions. When the computer instructions are run on an electronic device, the electronic device is enabled to perform the method according to any one of the first aspect or the possible implementations of the first aspect.

According to a fifth aspect, an embodiment of this application provides a computer program product. When the computer program product runs on a computer, the computer is enabled to perform the method according to any one of the first aspect, the second aspect, or the possible implementations of the first aspect and the second aspect.

It can be understood that, for beneficial effects that can be achieved by the electronic device according to any one of the second aspect or the possible implementations of the second aspect, the chip system according to the third aspect, the computer storage medium according to the fourth aspect, and the computer program product according to the fifth aspect, refer to the beneficial effects according to any one of the first aspect or the possible implementations of the first aspect. Details are not described herein again.

BRIEF DESCRIPTION OF DRAWINGS

FIG. 2(a), FIG. 2(b), and FIG. 2(c) are a schematic diagram of forms of an electronic device with a foldable screen according to an embodiment of this application;

FIG. 3(a), FIG. 3(b), and FIG. 3(c) are a schematic diagram of other forms of an electronic device with a foldable screen according to an embodiment of this application;

DESCRIPTION OF EMBODIMENTS

Figure 1A:
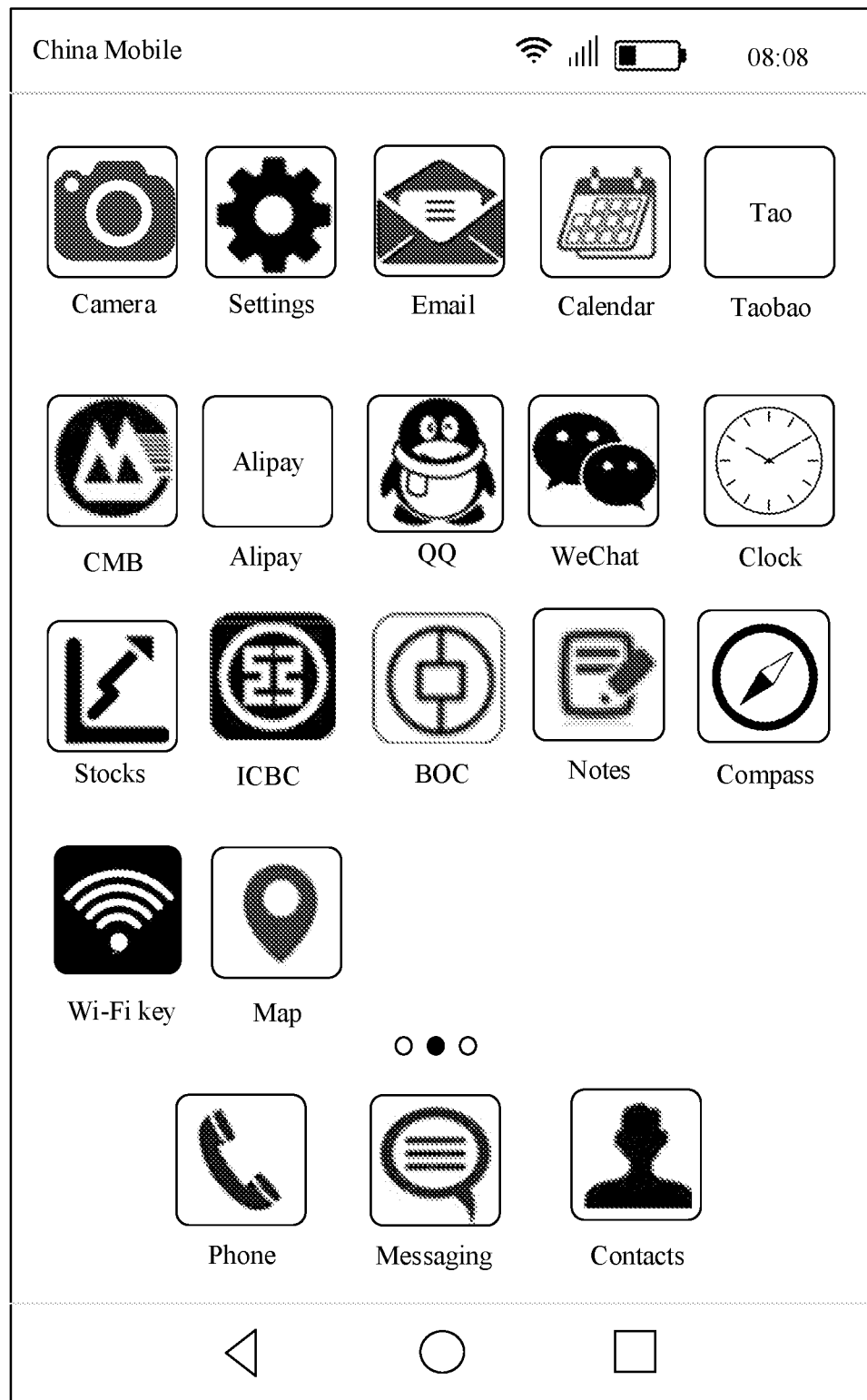
FIG. 1(a) and FIG. 1(b) are a schematic diagram of a foldable screen display method according to the background of this application.
Figure 1B:
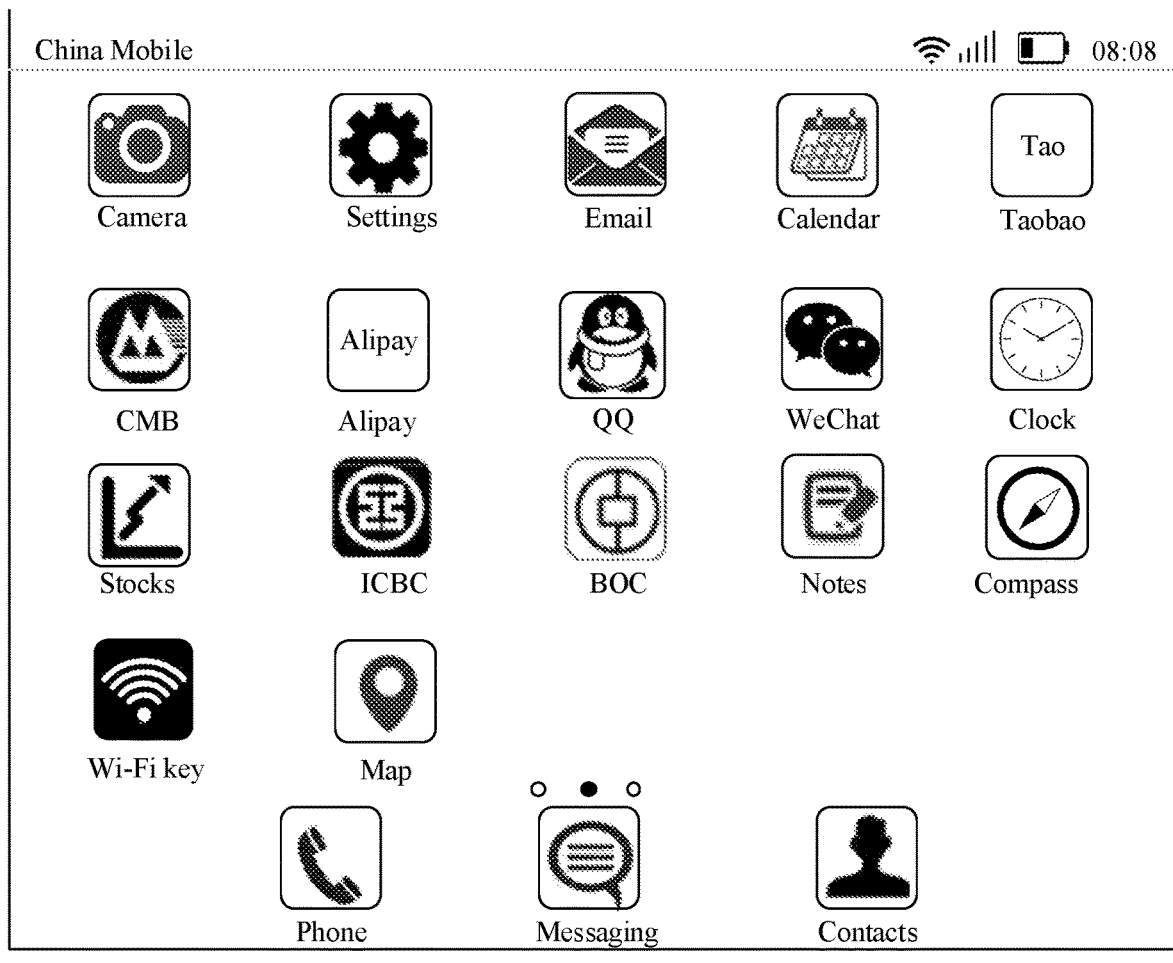

The following terms "first" and "second" are merely intended for description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more.

An embodiment of this application provides a foldable screen display method. In the method, after an electronic device in a folded state that displays a first interface changes from the folded state to an unfolded state, not only the first interface but also a second interface may be displayed. When the electronic device changes from the folded state to the unfolded state, content displayed on the electronic device is increased, providing more content for a user. This improves user experience.

The method provided in this embodiment of this application may be applied to an electronic device including a foldable screen. The electronic device may be folded so that the foldable screen is divided into a plurality of display regions. For example, the electronic device may be folded along a folding edge or a folding axis to form a first screen gand a second screen. In actual application, electronic devices with foldable screens may be classified into two types: an electronic device with an outward-foldable screen, and an electronic device with an inward-foldable screen. In an example in which an electronic device is folded to form a first screen and a second screen, after an outward-foldable electronic device is folded, a first screen and a second screen back each other. After an inward-foldable electronic device is folded, a first screen and a second screen face each other.

For example, FIG. 2 is a schematic diagram of a product form of an outward-foldable electronic device 100 according to an embodiment of this application. FIG. 2(a) is a schematic diagram of a form of the outward-foldable electronic device 100 that is fully unfolded. The electronic device 100 may be folded along a folding edge in a direction shown in FIG. 2(a), to form a first screen and a second screen shown in FIG. 2(b). The electronic device 100 may be further folded along the folding edge to obtain a form of the fully folded electronic device 100, as shown in FIG. 2(c). After the electronic device 100 is fully folded, the first screen and the second screen back each other.

It can be understood that, when the electronic device is in a folded state, an interface may be displayed on the first screen or the second screen; and when the electronic device is in an unfolded state, an interface may be displayed on each of the first screen and the second screen. For descriptions of the unfolded state and the folded state of the electronic device, refer to descriptions in the following embodiments. Details are not described herein.

For another example, FIG. 3 is a schematic diagram of a product form of an inward-foldable electronic device 100 according to an embodiment of this application. FIG. 3(a) is a schematic diagram of a form of the inward-foldable electronic device 100 that is fully unfolded. The electronic device 100 may be folded along a folding edge in a direction shown in FIG. 3(a), to form a first screen and a second screen shown in FIG. 3(b). The electronic device 100 may be further folded in the folding direction to obtain a form of the electronic device 100 that is fully folded, as shown in FIG. 3(c). After the electronic device 100 is fully folded, the first screen and the second screen face each other. The first screen and the second screen are invisible to a user. 401 shown in FIG. 3(c) indicates a line on a plane on which the first screen and the second screen are in contact with each other. In addition, the inward-foldable electronic device may further include a third screen, and the third screen is disposed on the back of the first screen or the second screen. It can be understood that, when the inward-foldable electronic device is in a folded state, the third screen is visible to a user. When the electronic device is in the folded state, an interface is displayed on the third screen; and when the electronic device is in an unfolded state, an interface may be displayed on each of the first screen and the second screen.

Generally, a value range of an included angle α between a first screen and a second screen of an electronic device with a foldable screen (including an outward-foldable electronic device and an inward-foldable electronic device) is [0°, 180°]. In this embodiment of this application, if $\alpha \in [0°, P]$, it may be determined that the electronic device is in a folded state; or if $\alpha \in (P, 180°]$, it may be determined that the electronic device is in an unfolded state. Alternatively, if $\alpha \in [0°, P)$, it may be determined that the electronic device is in a folded state; or if $\alpha \in [P, 180°]$, it may be determined that the electronic device is in an unfolded state. P is a preset angle threshold. P may be determined according to habits of using foldable screens by a large quantity of users, or P may be set by a user on the electronic device.

In some embodiments, according to usage habits of most users, when the included angle α between the first screen and the second screen is greater than 90°, there is a high possibility that a user wants to use the first screen and the second screen as a whole (that is, as a complete display). Therefore, the preset angle threshold P in this embodiment of this application may be greater than 90°. A value range of the preset angle threshold P may be (90°, 180°). For example, the preset angle threshold P may be 100°, 120°, 135°, 140°, 145°, or 150°.

It should be noted that at least two screens formed by folding the electronic device (including the inward-foldable electronic device and the outward-foldable electronic device) in this embodiment of this application may be a plurality of screens that exist independently, or may be a complete screen of an integrated structure that is folded into at least two parts.

For example, the foldable screen may be a flexible foldable screen. The flexible foldable screen includes a foldable edge made of a flexible material. A part or all of the flexible foldable screen is made of the flexible material. At least two screens formed by folding the flexible foldable screen are a complete screen of an integrated structure that is folded into at least two parts.

For another example, the foldable screen of the electronic device may be a multi-screen foldable screen. The multi-screen foldable screen may include a plurality of (two or more) screens. The plurality of screens are a plurality of separate displays. These screens may be connected sequentially through folding axes. Each screen may rotate around a folding axis connected to the screen, so that the multi-screen foldable screen is folded.

For example, the electronic device in this embodiment of this application may be a mobile phone, a tablet computer, a desktop computer, a laptop computer, a handheld computer, a notebook computer, an ultra-mobile personal computer (UMPC), a netbook, or a device including a touchscreen, such as a cellular phone, a personal digital assistant (PDA), or an augmented reality (AR) virtual reality (VR) device. A specific form of the electronic device is not particularly limited in this embodiment of this application.

Figure 4:
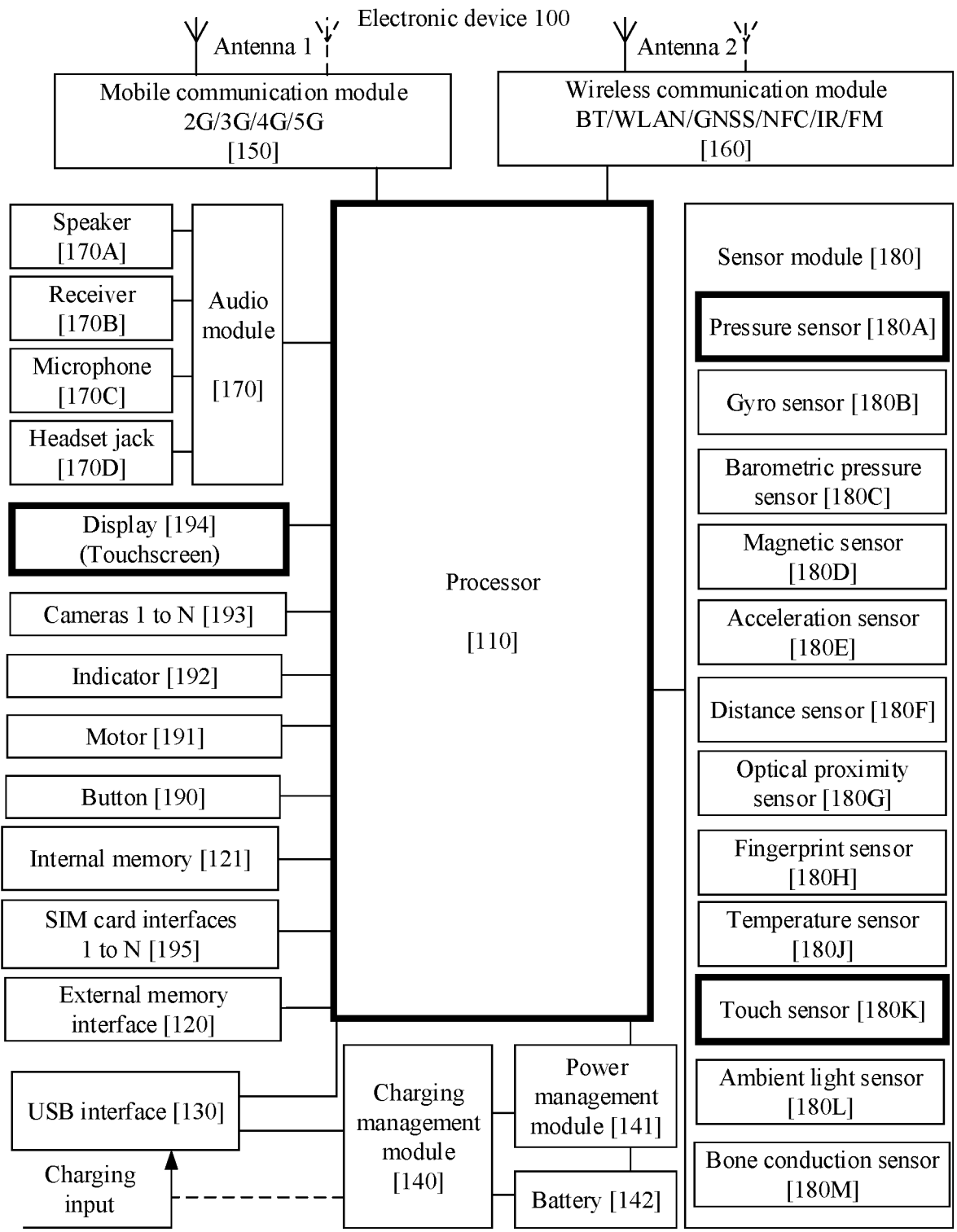
FIG. 4 is a schematic diagram of a hardware structure of an electronic device according to an embodiment of this application.

The following describes implementations of the embodiments of this application in detail with reference to accompanying drawings. FIG. 4 is a schematic diagram of a structure of an electronic device 100 according to an embodiment of this application. As shown in FIG. 4, the electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like.

The sensor module 180 may include sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It may be understood that a structure shown in the embodiments of the present disclosure does not constitute a specific limitation on the electronic device 100. In some other embodiments of this application, the electronic device 100 may include more or fewer components than those shown in the figure, or some components may be combined, or some components may be split, or different component arrangements may be used. The components in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory, avoiding repeated access, and reducing waiting duration of the processor 110. This improves system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It can be understood that an interface connection relationship between the modules shown in the embodiments of the present disclosure is merely an example for description, and does not constitute a limitation on the structure of the electronic device 100. In some other embodiments of this application, the electronic device 100 may alternatively use an interface connection mode different from that in the foregoing embodiment, or a combination of a plurality of interface connection modes.

The charging management module 140 is configured to receive a charging input from a charger. The charger may be a wireless charger or a wired charger. In some embodiments in which wired charging is used, the charging management module 140 may receive a charging input from the wired charger through the USB interface 130. In some embodiments in which wireless charging is used, the charging management module 140 may receive a wireless charging input through a wireless charging coil of the electronic device 100. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 each are configured to transmit and receive electromagnetic wave signals. Each antenna in the electronic device 100 may be configured to cover one or more communication frequency bands. Different antennas may be further reused to improve antenna utilization. For example, the antenna 1 may be reused as a diversity antenna in a wireless local area network. In some other embodiments, an antenna may be used in combination with a tuning switch.

The mobile communication module 150 may provide a wireless communication solution that includes 2G/3G/4G/5G and the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (not limited to the speaker 170A, the receiver 170B, and the like), or displays an image or a video by using the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 100. The wireless communication module 160 may be one or more devices that integrate at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric calculation, and is used for graphics rendering. The processor 110 may include one or more GPUs that execute a program instruction to generate or change display information.

The display 194 is configured to display an image, a video, and the like. The display 194 includes a display panel. The display panel may use a liquid crystal display (LCD), an organic light-emitting diode (OLED), an active-matrix organic light emitting diode or an active-matrix organic light emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 may implement a shooting function through the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into an image that is perceptible to the eyes. The ISP may further perform algorithm optimization on noise, brightness, and complexion of the image. The ISP may further optimize parameters such as exposure and color temperature of a shooting scene. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor. The NPU quickly processes input information by referring to a biological neural network structure, for example, by referring to a mode of transfer between human brain neurons, and may further continuously perform self-learning. The electronic device 100 may implement intelligent cognition such as image recognition, facial recognition, speech recognition, and text understanding through the NPU.

The external memory interface 120 may be configured to connect to an external storage card such as a micro SD card, to extend a storage capability of the electronic device 100. The external storage card communicates with the processor 110 through the external memory interface 120, to implement a data storage function, for example, to store files such as music and a video in the external storage card.

The internal memory 121 may be configured to store computer-executable program code. The executable program code includes instructions. The processor 110 runs the instructions stored in the internal memory 121, to perform various function applications of the electronic device 100 and process data. The internal memory 121 may include a program storage region and a data storage region. The program storage region may store an operating system, an application required by at least one function (for example, a sound playing function and an image playing function), and the like. The data storage region may store data (for example, audio data, a phone book, and the like) created in a process of using the electronic device 100, and the like. In addition, the internal memory 121 may include a high-speed random access memory, or may include a nonvolatile memory, for example, at least one magnetic disk storage device, a flash memory device, or a universal flash storage (UFS).

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to perform audio signal encoding and decoding. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 answers a call or receives voice information, the receiver 170B may be placed near a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130 or a 3.5-mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A such as a resistive pressure sensor, an inductive pressure sensor, and a capacitive pressure sensor. The capacitive pressure sensor may include at least two parallel plates made of conductive materials. Capacitance between electrodes changes when force is applied to the pressure sensor 180A. The electronic device 100 determines pressure intensity based on a change of the capacitance. When a touch operation is performed on the display 194, the electronic device 100 detects a strength of the touch operation based on the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messaging icon, an instruction for viewing an SMS message is executed. When a touch operation whose touch operation intensity is greater than or equal to the first pressure threshold is performed on the Messaging icon, an instruction for creating a new SMS message is executed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyro sensor 180B may be further used in a navigation scenario and a somatic game scenario. In this embodiment of this application, the electronic device 100 may be folded, so that a foldable screen is divided into a plurality of display regions, and each display region may be referred to as a screen. Each screen may include a gyro sensor 180B, configured to measure an orientation (that is, a direction vector of an orientation) of the corresponding screen. The electronic device 100 may determine an included angle between adjacent screens based on an angle change of the orientation of each screen that is obtained through measurement.

It should be noted that, in this embodiment of this application, the electronic device includes a foldable screen. After the electronic device is folded, the foldable screen is divided into a plurality of display regions, and each display region is referred to as a screen. Each screen may include a gyro sensor 180B, configured to measure an orientation (that is, a direction vector of an orientation) of the corresponding screen. For example, with reference to FIG. 2, as shown in FIG. 2(*b*), after the electronic device is folded, a first screen and a second screen are formed. A gyro sensor 180B is disposed on each of the first screen and the second screen. The two gyro sensors 180B may measure orientations of the first screen and the second screen respectively. The electronic device determines an included angle between the first screen and the second screen based on an angle change of the orientation of each screen that is obtained through measurement.

Figure 5A:
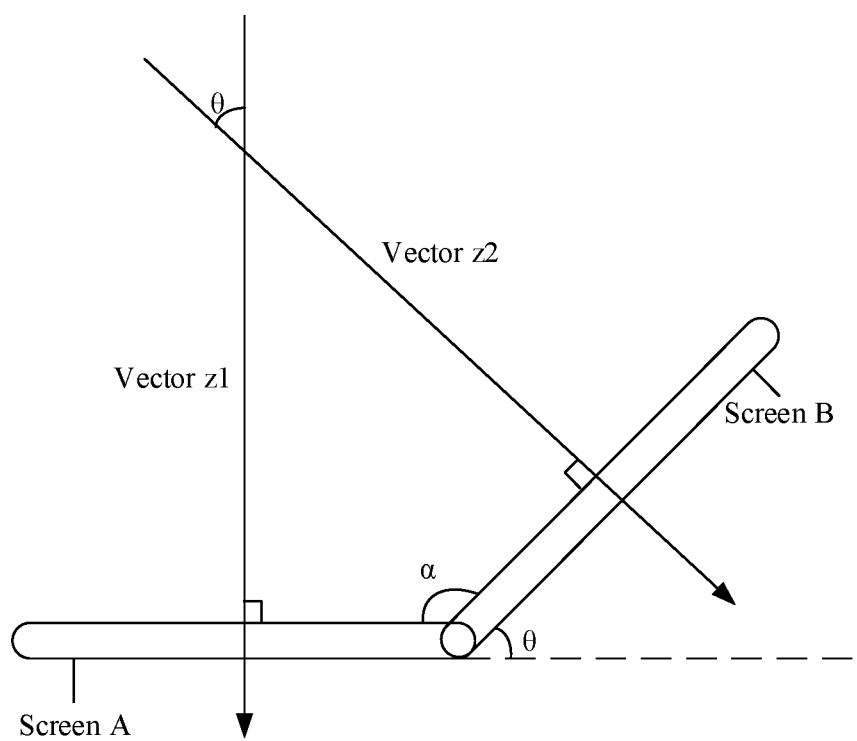
FIG. 5A is a schematic diagram of a principle of calculating an included angle α between a screen A and a screen B according to an embodiment of this application.

For example, the electronic device 100 is folded to form a first screen (indicated by A) and a second screen (indicated by B) shown in FIG. 5A. A gyro sensor A is disposed on the screen A, and a gyro sensor B is disposed on the screen B. A principle of measuring an orientation (that is, a direction vector of an orientation) of the screen A by the gyro sensor A and measuring an orientation (that is, a direction vector of an orientation) of the screen B by the gyro sensor B, and a principle of calculating an included angle α between the screen A and the screen B by the electronic device 100 based on the orientation of the screen A and the orientation of the screen B are described herein in this embodiment of this application.

Figure 5B:
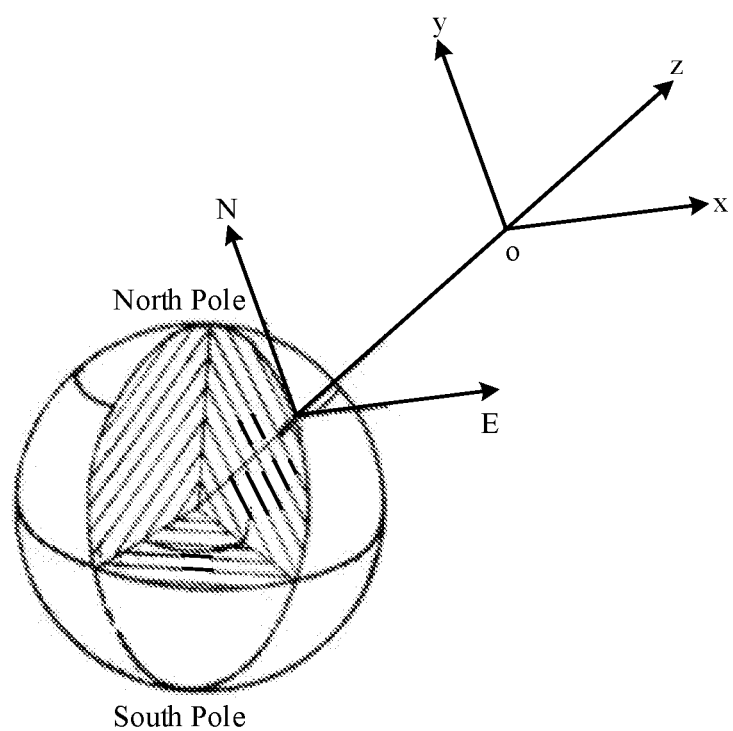
FIG. 5B is a schematic diagram of an example of a geographic coordinate system according to an embodiment of this application.

A coordinate system of the gyro sensor is a geographic coordinate system. As shown in FIG. 5B, an origin O of the geographic coordinate system is located at a point at which a carrier (that is, a device including a gyro sensor, for example, the electronic device 100) is located. An x axis points to the east (E) along a local latitude line. A y axis points to the north (N) along a local meridian line. A z axis points upward along a local geographic vertical line, and forms a right-handed rectangular coordinate system with the x axis and the y axis. A plane including the x axis and the y axis is the local horizontal plane, and a plane including the y axis and the z axis is a local meridian plane. Therefore, it can be understood that, in the coordinate system of the gyro sensor, the gyro sensor is the origin O, the x axis points to the east along the local latitude line, the y axis points to the north along the local meridian line, and the z axis points upward along the local geographic vertical line (that is, an opposite direction of the geographic vertical line).

By using the gyro sensor 180B disposed in each screen, the electronic device 100 may obtain, through measurement, a direction vector of an orientation of each screen in a coordinate system of the gyro sensor disposed in the screen. For example, referring to a side view of the electronic device shown in FIG. 5A, a direction vector, obtained by the electronic device through measurement, of an orientation of the screen A in a coordinate system of the gyro sensor A is a vector z1, and a direction vector of an orientation of the screen B in a coordinate system of the gyro sensor B is a vector z2. The electronic device 100 may calculate an included angle θ between the vector z1 and the vector z2 according to formula (1):

$$\theta = \arccos\left(\frac{\vec{z1} \cdot \vec{z2}}{|\vec{z1}| \times |\vec{z2}|}\right).$$

It can be further learned from FIG. 5A that, because the vector z1 is perpendicular to the screen A and the vector z2 is perpendicular to the screen B, the included angle α between the screen A and the screen B may be obtained as follows: α=1800-0. To be specific, the electronic device may determine the included angle α between the screen A and the screen B based on the direction vector (namely, the vector z1) of the orientation of the screen A in the coordinate system of the gyro sensor A and the direction vector (namely, the vector z2) of the orientation of the screen B in the coordinate system of the gyro sensor B, where the direction vectors are obtained through measurement.

It should be noted that locations of the gyro sensors disposed on the screen A and the screen B do not overlap, that is, origins of the coordinate systems of the gyro sensors in the screen A and the screen B do not overlap. However, an x axis, y axis, and z axis of the coordinate system of the gyro sensor in the screen A are parallel to those of the coordinate system of the gyro sensor in the screen B. In this case, it may be considered that the coordinate systems of the gyro sensors disposed in the screen A and the screen B are parallel. In this way, although the vector z1 and the vector z2 are in different coordinate systems, because the axes of the two coordinate systems are parallel, the included angle θ between the vector z1 and the vector z2 may still be calculated according to formula (1).

In some embodiments, one or more other sensors may alternatively be used in cooperation to measure the included angle α between the screen A and the screen B. For example, an acceleration sensor 180E may be disposed in each screen of the foldable screen. The electronic device 100 (for example, the processor 110) may measure, by using the acceleration sensor, a motion acceleration when each screen is rotated; and then calculate, based on the motion acceleration obtained through measurement, an angle at which one screen rotates relative to another screen, that is, the included angle α between the screen A and the screen B.

In some other embodiments, the gyro sensor 180B may be a virtual gyro sensor formed through cooperation of a plurality of other sensors. The virtual gyro sensor may be configured to calculate an included angle between adjacent screens of the foldable screen, that is, the included angle α between the screen A and the screen B.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D, to set a feature such as automatic unlocking through flipping based on a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may be further configured to identify a posture of the electronic device, and is applied to application such as a pedometer and switching between a landscape mode and a portrait mode.

The distance sensor 180F is configured to measure a distance. The electronic device 100 may measure the distance in an infrared manner or a laser manner. In some embodiments, in a shooting scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense brightness of ambient light. The electronic device 100 may adaptively adjust brightness of the display 194 based on the sensed ambient light brightness. The ambient light sensor 180L may be further configured to automatically adjust a white balance during shooting. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation acting on or near the touch sensor 180K. The touch sensor may transfer the detected touch operation to the application processor, to determine a type of a touch event. The display 194 may provide a visual output related to the touch operation. In some other embodiments, the touch sensor 180K may also be disposed on a surface of the electronic device 100 in a location different from that of the display 194.

The bone conduction sensor 180M may obtain a vibration signal. In some embodiments, the bone conduction sensor 180M may obtain a vibration signal of a vibration bone of a human voice part. The bone conduction sensor 180M may also be in contact with a human pulse, and receive a blood pressure beating signal. In some embodiments, the bone conduction sensor 180M may alternatively be disposed in a headset, to obtain a bone conduction headset. The audio module 170 may obtain a voice signal through parsing based on the vibration signal of a vibration bone of a vocal part obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, shooting and audio playing) may correspond to different vibration feedback effects. The motor 191 may also correspond to different vibration feedback effects for touch operations performed on different regions of the display 194. Different application scenarios (for example, a time reminder scenario, an information receiving scenario, an alarm clock scenario, and a game scenario) may also correspond to different vibration feedback effects. A touch vibration feedback effect may alternatively be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type, or may be of different types. The SIM card interface 195 may be further compatible with different types of SIM cards. The SIM card interface 195 may also be compatible with the external storage card. The electronic device 100 interacts with a network by using the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

All methods in the following embodiments may be implemented in the electronic device 100 having the foregoing hardware structure.

A software system of the electronic device 100 may use a layered architecture, an event-driven architecture, a microkernel architecture, a micro service architecture, or a cloud architecture. In the embodiments of this application, an Android system with a layered architecture is used as an example to describe a software structure of the electronic device 100.

Figure 6:
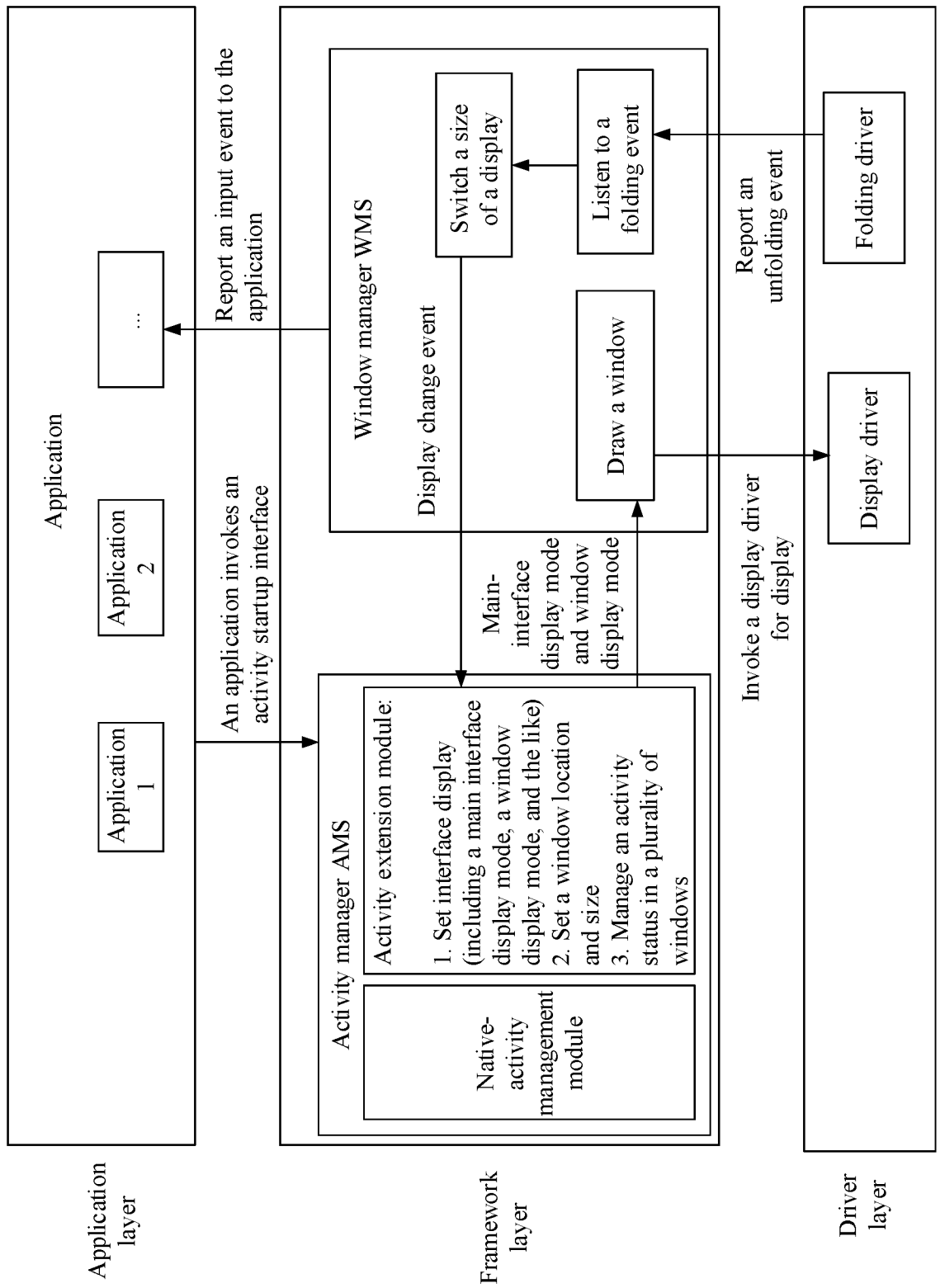
FIG. 6 is a schematic diagram of an example of a software architecture of an electronic device according to an embodiment of this application.

FIG. 6 is a block diagram of a software structure of an electronic device 100 according to an embodiment of this application. In the layered architecture, software is divided into several layers, and each layer has a clear role and task. The layers communicate with each other through a software interface. In some embodiments, the Android system is divided into three layers from top to bottom: an application program layer (application layer for short), an application program framework layer (framework layer for short), and a kernel layer (which is also referred to as a driver layer).

The application layer may include a series of application program packages. As shown in FIG. 6, the application layer may include a plurality of application program packages such as an application 1 and an application 2. For example, the application program packages may be application programs such as Camera, Gallery, Calendar, Phone, Map, Navigation, WLAN, Bluetooth, Music, Videos, Messaging, and Desktop launcher (launcher).

The framework layer provides an application programming interface (API) and a programming framework for an application program at the application program layer. The application program framework layer includes some predefined functions. As shown in FIG. 6, the framework layer may include a window manager (WMS), an activity manager (AMS), and the like. Optionally, the framework layer may further include a content provider, a view system, a phone manager, a resource manager, a notification manager, and the like (which are not shown in the figure).

The window manager WMS is configured to manage a window program. The window manager may obtain a size of the display, determine whether there is a status bar, perform screen locking, take a screenshot, and the like. The activity manager AMS is configured to manage activities, and is responsible for work such as startup, switching, and scheduling of each component in the system, and management and scheduling of the application programs. The kernel layer is a layer between hardware and software. The kernel layer includes at least a display driver, a camera driver, an audio driver, and a sensor driver. The kernel layer is a layer between hardware and software. The kernel layer may include a display driver, an input/output device driver (for example, a driver for a keyboard, a touchscreen, a headset, a speaker, or a microphone), a camera driver, an audio driver, a sensor driver, and the like.

When a user performs an input operation (for example, an operation of unfolding the electronic device) on the electronic device 100, the kernel layer may generate a response input event (for example, a foldable screen unfolding event) based on the input operation, and report the event to the application program framework layer. The activity manager server AMS at the application program framework layer sets interface display (including a main-interface display mode, a window display mode, and the like). The window manager server WMS at the application program framework layer draws an interface based on the settings of the AMS, and then sends interface data to the display driver at the kernel layer. The display driver displays the corresponding interface on the foldable screen.

The display solution provided in this embodiment of this application is implemented based on a freeform (freeform) feature and a multi-window and multitasking infrastructure of Google. For a display procedure provided in this embodiment of this application, refer to FIG. 6. As shown in FIG. 6, in this embodiment of this application, the activity manager AMS may include a native-activity management module and an activity extension module. The native-activity management module is configured to manage activities, and is responsible for work such as startup, switching, and scheduling of each component in the system, and management and scheduling of the application programs. The activity extension module is configured to set a main-interface display mode, a window display mode, and the like based on a folded state or an unfolded state of the foldable screen.

It can be understood that, in a process of displaying an interface by the electronic device 100, the foldable screen of the electronic device 100 may switch from the folded state to the unfolded state, or switch from the unfolded state to the folded state. In this case, a folding driver (the input/output device driver) at the driver layer may detect a folding event entered by the user. In this embodiment of this application, the folding event may be triggered by an operation of controlling, by the user, the foldable screen to change from the folded state to the unfolded state, and is referred to as a folding event 1. Alternatively, the folding event may be triggered by an operation of controlling, by the user, the foldable screen to change from the unfolded state to the folded state, and is referred to as a folding event 2. The folding driver may report the folding event to the window manager WMS at the framework layer (namely, the application program framework layer).

The window manager WMS may listen to a folding event, and may determine to switch a size of a display (display) when detecting a folding event. The window manager WMS sends a display change event to the activity manager AMS, and the activity manager AMS sets a window mode and a window attribute. When detecting the folding event 1, the window manager WMS may determine that the display becomes larger, and send a display change event 1 to the activity manager AMS. The display change event 1 is used to trigger the activity manager AMS to switch the window mode from a full-screen mode to a multi-window mode or a single-window mode and adjust the window attribute. When detecting the folding event 2, the window manager WMS may determine that the display becomes smaller, and send a display change event 2 to the activity manager AMS. The display change event 2 is used to trigger the activity manager AMS to switch the window mode from the multi-window mode or the single-window mode to the full-screen mode and adjust the window attribute.

After setting the activity window mode and attribute, the activity manager AMS may request the window manager WMS to draw a window, and invoke the display driver to display drawn window content, to present the interface to the user.

For example, in response to the display change event 1, the activity manager AMS requests the window manager WMS to draw a window, and invokes the display driver to display an interface. The interface may be as follows: When the foldable screen is unfolded, a main interface is displayed in a first display region of the foldable screen, and a second interface is displayed in a second display region. The second interface is different from the main interface. Alternatively, in response to the display change event 1, an interface displayed by the display driver may be as follows: When the foldable screen is unfolded, a first main interface is displayed in a first display region of the foldable screen, and a second main interface is displayed in a second display region of the foldable screen. In response to the display change event 2, the activity manager AMS requests the window manager WMS to draw a window, and invokes the display driver to display an interface. The interface may be as follows: The electronic device displays one main interface in full screen in the folded state.

Figure 7:
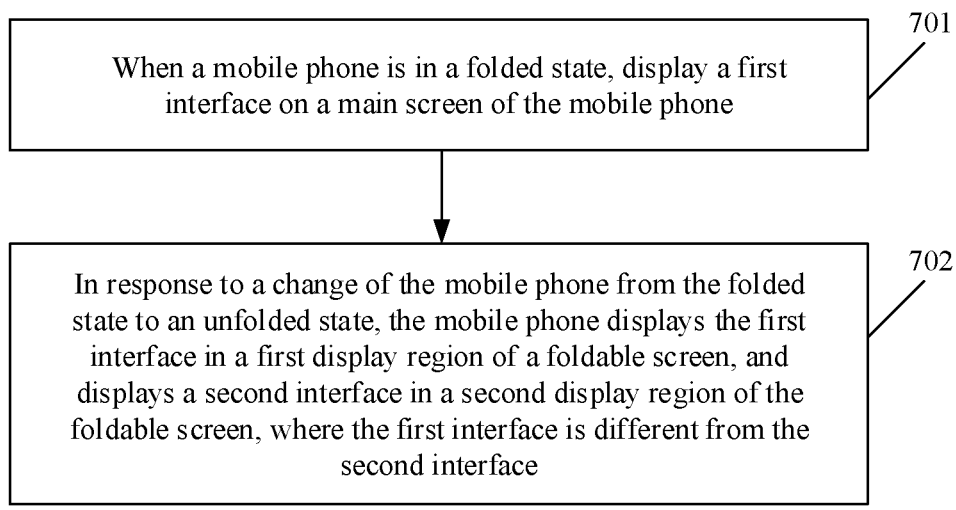
FIG. 7 is a flowchart of a foldable screen display method according to an embodiment of this application.

The following describes a foldable screen display method in this application by using an example in which an electronic device is an outward-foldable mobile phone. When the outward-foldable mobile phone is in a folded state, a first screen or a second screen may serve as a main screen. As shown in FIG. 7, the foldable screen display method includes step 701 and step 702.

Step 701: When the mobile phone is in the folded state, display a first interface on the main screen of the mobile phone.

When the outward-foldable mobile phone is in the folded state, the first screen or the second screen serves as the main screen of the mobile phone and displays the first interface. The first interface may be a main interface of the mobile phone, and the first interface includes a plurality of first application icons.

Figure 8A:
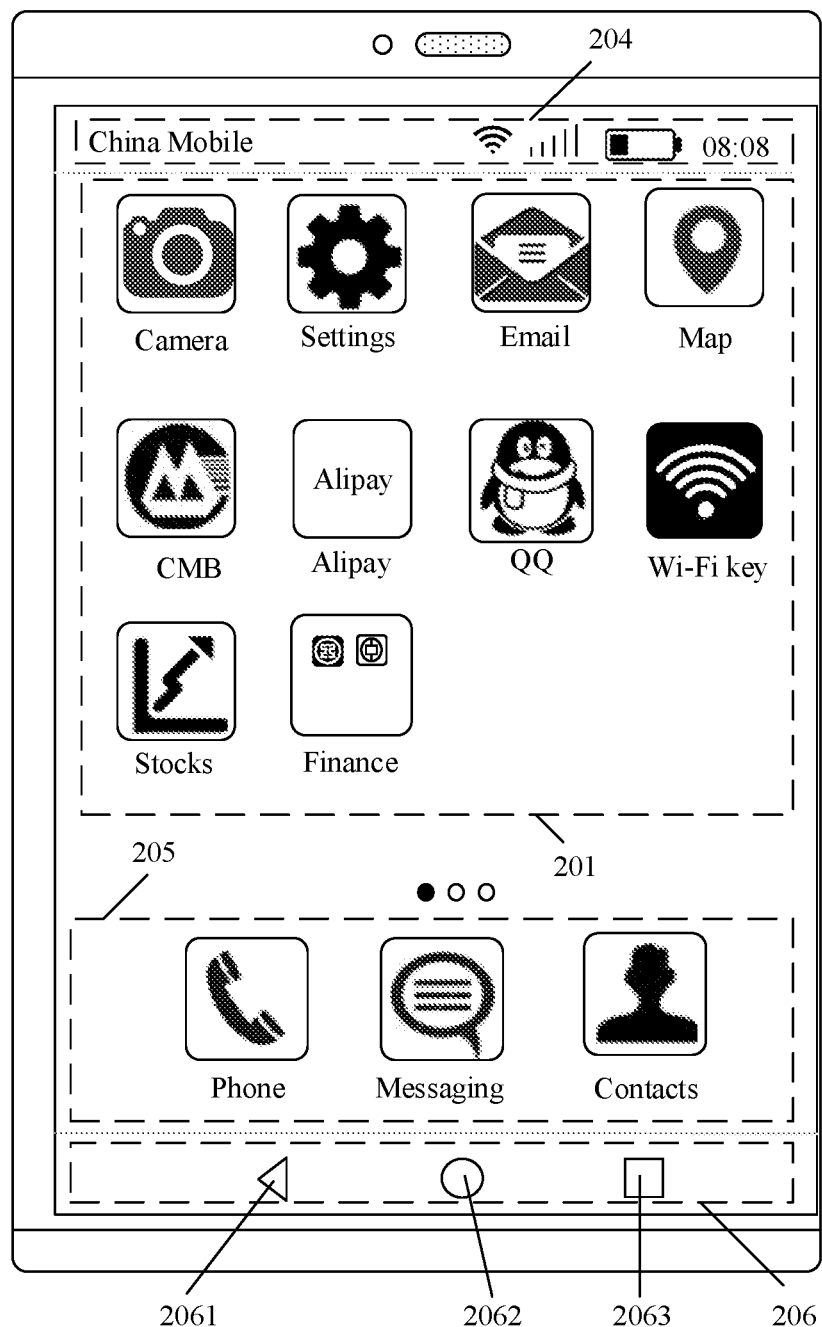
FIG. 8(a), FIG. 8(b), and FIG. 8(c) are a schematic diagram of main interfaces displayed in a folded state according to an embodiment of this application.
Figure 8B:
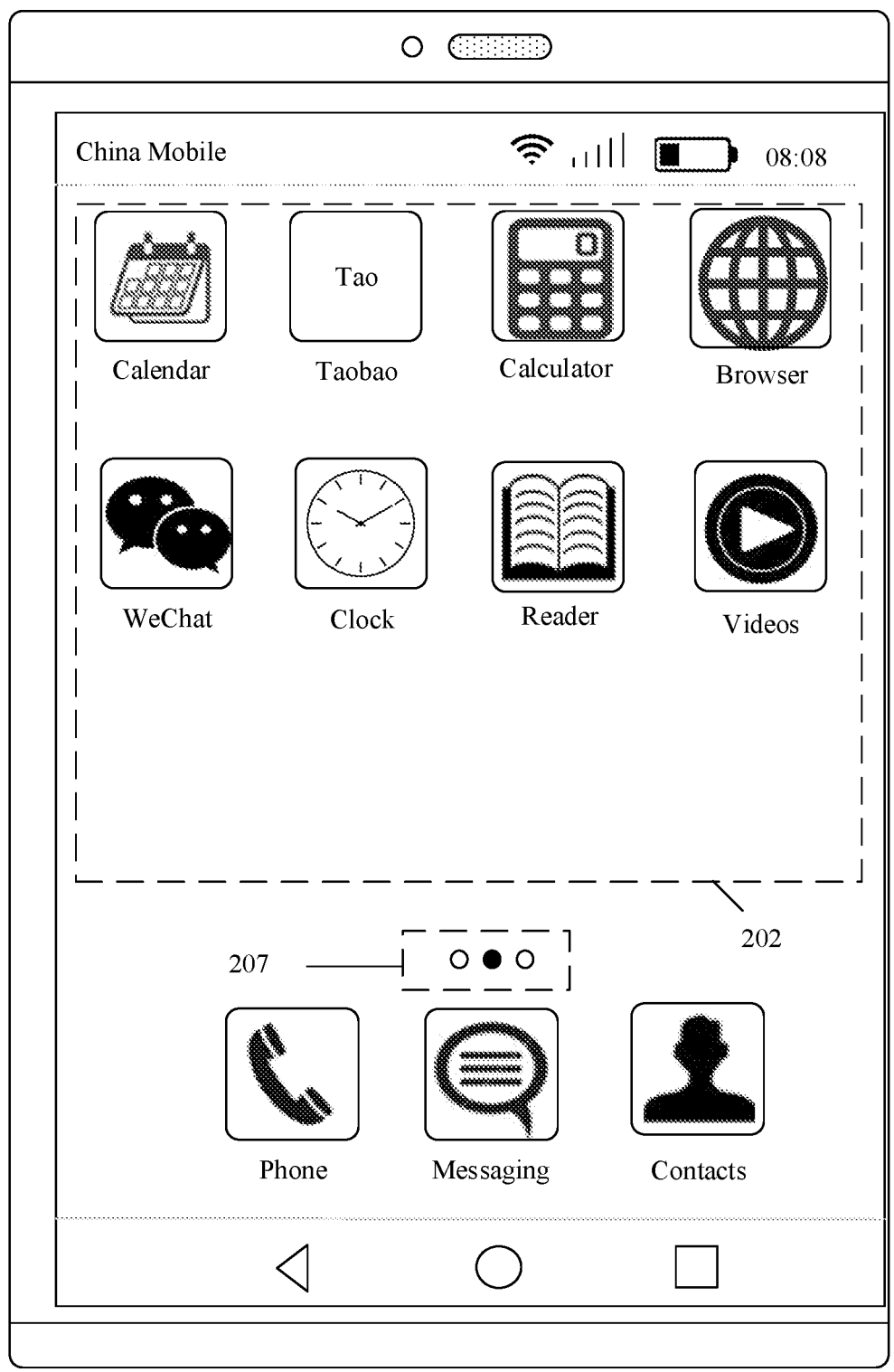
Figure 8C:
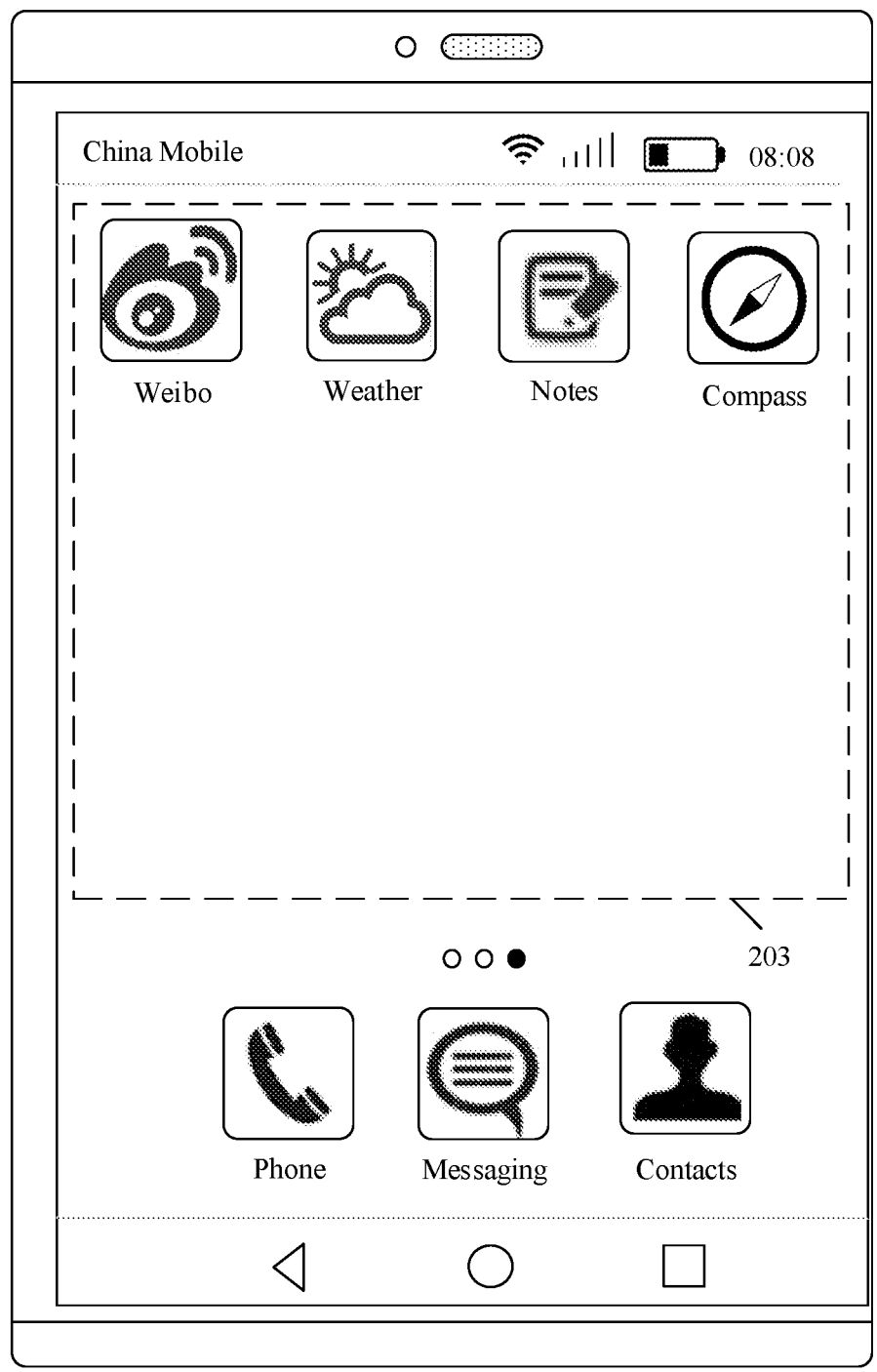

The mobile phone may include one or more main interfaces. For example, a main interface 201 shown in FIG. 8(a), a main interface 202 shown in FIG. 8(b), and a main interface 203 shown in FIG. 8(c) are all main interfaces of the mobile phone. The main interface may be a part of a home screen (home screen) of the mobile phone.

A plurality of applications may be installed on the mobile phone, and application icons of the applications are displayed on the home screen (home screen) of the mobile phone. An application icon of an application is a startup entry for the application, and the application icon may also be referred to as an entry element of the application, or the like. The application in this embodiment of this application may be an embedded application (that is, a system application of the mobile phone), or may be a downloadable application.

The home screen of the mobile phone may also be referred to as a desktop. As shown in FIG. 8(a), the home screen includes a status bar 204, a main interface 201, a dock bar (dock bar) 205, and a navigation bar (navigation bar) 206.

The status bar 204 is located at the top of the screen of the mobile phone, and includes status information of the mobile phone, such as time, a battery level, a network connection, and an operator. The main interface 201 is located in the middle of the screen of the mobile phone, and includes a plurality of first application icons, such as an application icon of a Camera application, an application icon of a Settings application, and an application icon of a Map application shown in FIG. 8(a).

The dock bar (Dock Bar) 205 is a part of an entire window that fills a touchscreen of a mobile phone or a part of an Activity (Activity, that is, an application region for displaying an application icon) that is suspended on another window. Visually, the dock bar 205 is located below the Activity and is located above the navigation bar 206.

The navigation bar (Navigation Bar) 206 is a shortcut key bar at the bottom of the screen of the mobile phone, and generally appears at the bottom of the screen of the mobile phone in a form of virtual keys. The navigation bar 206 includes three keys by default. As shown in FIG. 8(a), the navigation bar 206 includes a Back key 2061, a Home key 2062, and a Recent (Recent) key 2063. The Back key is configured to return to a previous interface. The Home key is configured to return to the desktop. The Recent key is configured to display a recently used application program. Alternatively, the home screen may not include the navigation bar. The functions of the buttons on the navigation bar may alternatively be implemented through gesture control.

Step 702: In response to a change of the mobile phone from the folded state to an unfolded state, the mobile phone displays the first interface in a first display region of the foldable screen, and displays a second interface in a second display region of the foldable screen, where the first interface is different from the second interface.

In some embodiments, the first display region of the mobile phone is a display region corresponding to the first screen of the mobile phone, and the second display region of the mobile phone is a display region corresponding to the second screen of the mobile phone. Specifically, a folding edge of the foldable screen serves as a boundary. When a user faces the unfolded foldable screen, the first display region is on the right side of the folding edge of the foldable screen, and the second display region is on the left side of the folding edge of the foldable screen; or the first display region is on the left side of the folding edge of the foldable screen, and the second display region is on the right side of the folding edge of the foldable screen. This better adapts to habits of using an electronic device with a foldable screen by most users.

In some other embodiments, sizes of the first display region and the second display region may alternatively be different, and the sizes of the first display region and the second display region may be preset by the user and stored in the mobile phone. The sizes of the first display region and the second display region may be the same or different.

An example in which the sizes of the first display region and the second display region are the same, the first display region is located on the left side of the foldable screen, and the second display region is located on the right side of the foldable screen is used for description below.

In a first implementation, the second interface includes one or more second application icons. The second interface is a main interface of the mobile phone. The mobile phone may include a plurality of main interfaces. The second interface is different from the first interface.

Figure 9A:
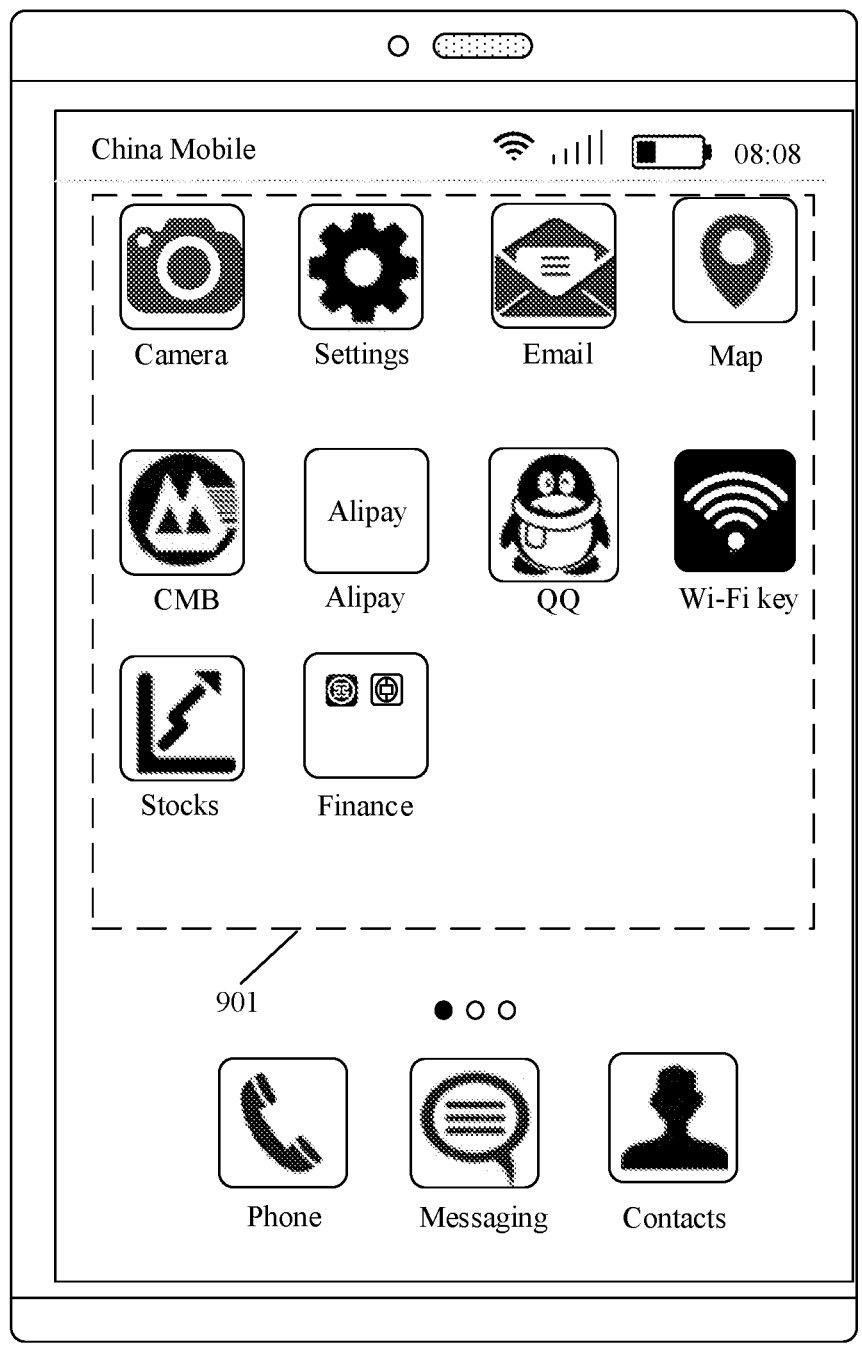
FIG. 9A(a) and FIG. 9A(b) are a schematic diagram of examples of application interfaces displayed on a foldable screen according to an embodiment of this application.
Figure 9A:
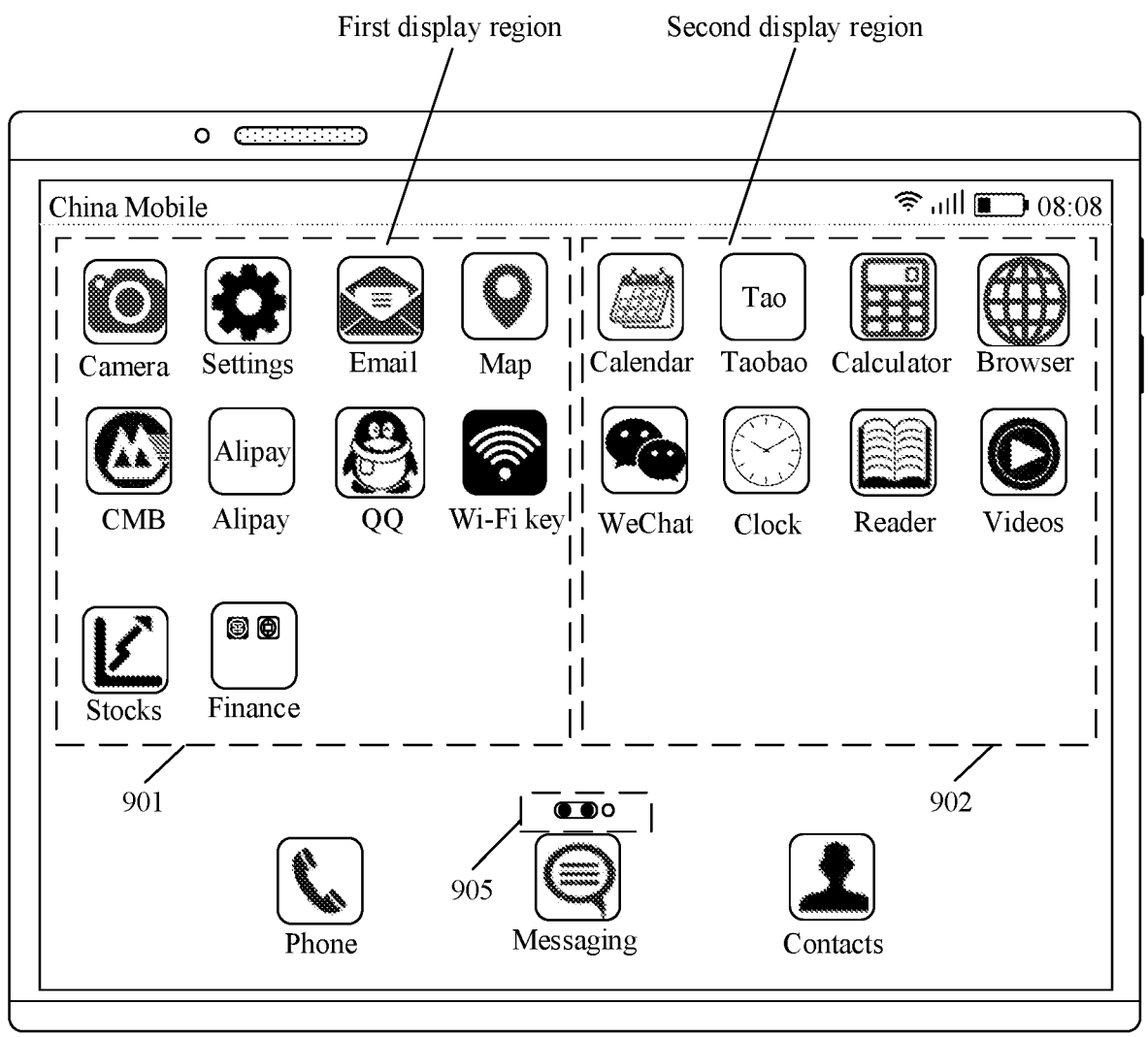

For example, when the mobile phone is in the folded state, a first interface 901 shown in FIG. 9A(a) is displayed. In response to a change of the mobile phone from the folded state to the unfolded state, as shown in FIG. 9A(b), the mobile phone displays the first interface 901 in the first display region of the foldable screen, and displays a second interface 902 in the second display region. The second interface 902 includes a plurality of second application icons shown in FIG. 9A(b). Both the first interface 901 and the second interface 902 are main interfaces of the mobile phone, and the first interface 901 is different from the second interface 902.

It should be noted that, in the first implementation, the second application icons included in the second interface 902 are different from first application icons included in the first interface 901.

The mobile phone changes from the folded state to the unfolded state, and the mobile phone may display not only the first interface, but also the second interface. Because both the first interface and the second interface are main interfaces, the user may view application icons on the two main interfaces, providing more content for the user. This improves user experience.

In a second implementation, the second interface includes one or more second application icons. The second application icon may be an application icon of an application that has recently been run on the mobile phone and that has not been closed.

Figure 9B:
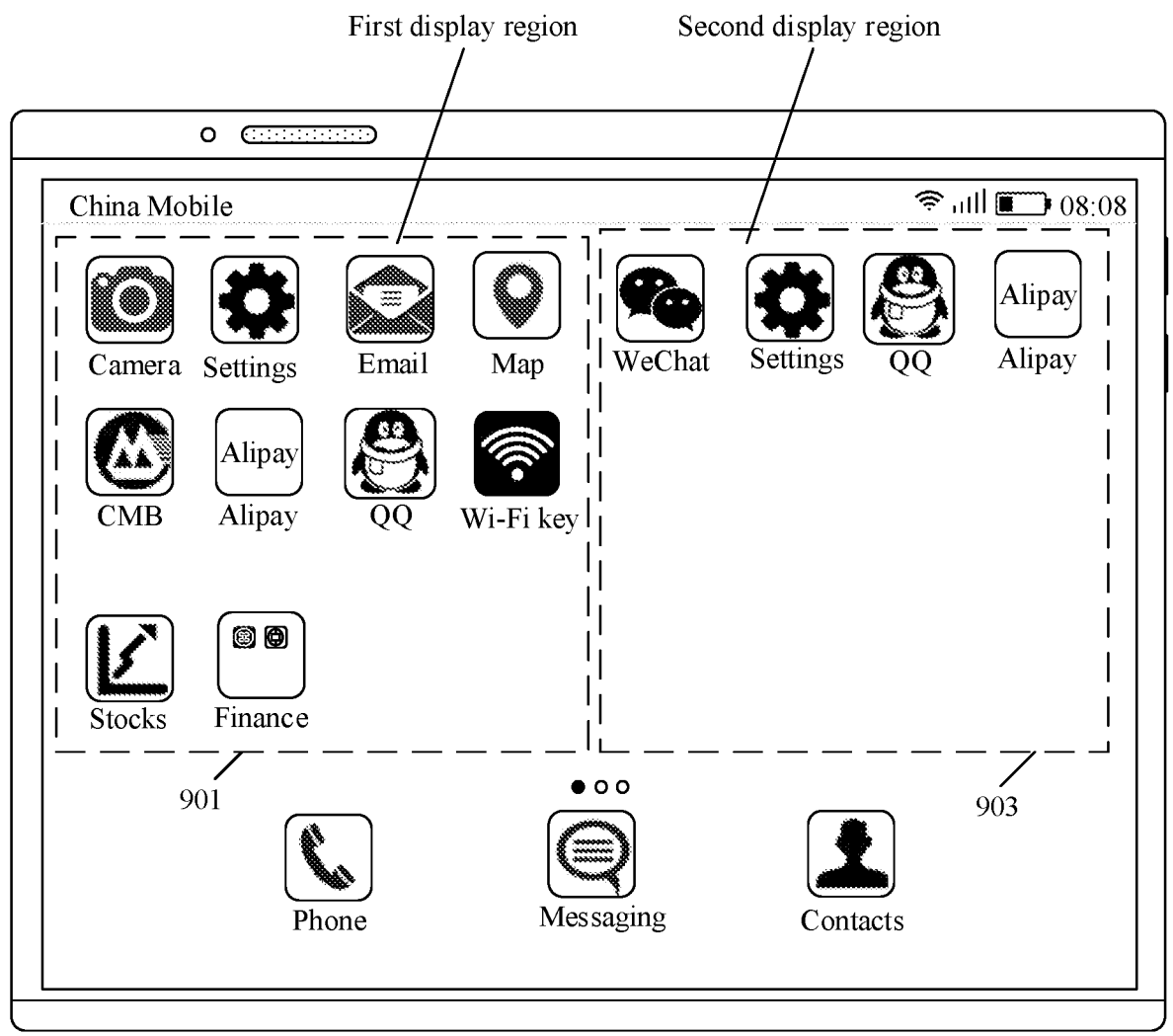
FIG. 9B is a schematic diagram of another example of an application interface displayed on a foldable screen according to an embodiment of this application.

For example, applications that have recently been run on the mobile phone and that have not been closed include the following applications: Settings, WeChat, QQ, and Alipay. It is assumed that, when the mobile phone is in the folded state, a first interface 901 shown in FIG. 9A(a) is displayed. In response to a change of the mobile phone from the folded state to the unfolded state, the mobile phone displays an interface shown in FIG. 9B. The mobile phone may display the first interface 901 in the first display region of the foldable screen, and display a second interface 903 in the second display region. The second interface 903 includes an application icon of the Settings application, an application icon of the WeChat application, an application icon of the QQ application, and an application icon of the Alipay application.

Alternatively, the second application icon may be an application icon of an application that has been used more than a preset quantity of times within a preset period of time. In a process of using the mobile phone by the user, the mobile phone may count a quantity of times of using each application within the preset period of time, to obtain the application that has been used more than the preset quantity of times.

Alternatively, the second application icon may be an application icon of an application that has been used longer than preset duration within a preset period of time. In a process of using the mobile phone by the user, the mobile phone may count duration of using each application within the preset period of time, to obtain the application that has been used longer than the preset duration.

It should be noted that, in the second implementation, the second application icon included in the second interface may be the same as a part of the first application icons included in the first interface. For example, the second application icon is an application icon of an application that has recently been run on the mobile phone and that has not been closed. The application that has recently been run on the mobile phone and that has not been closed may be an application corresponding to a part of the first application icons.

Figure 9C:
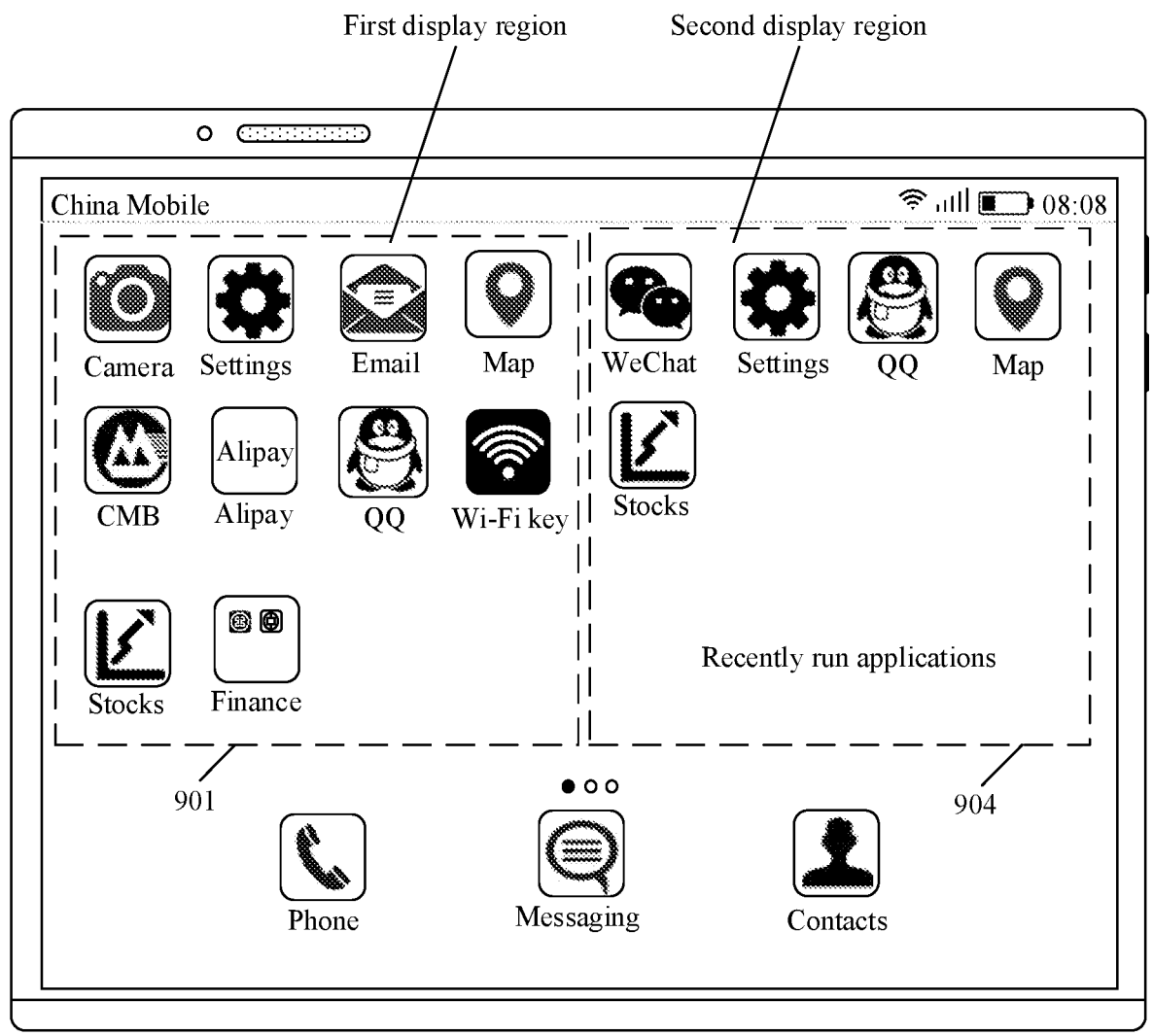
FIG. 9C is a schematic diagram of another example of an application interface displayed on a foldable screen according to an embodiment of this application.

In this case, to avoid displaying an application icon of a same application in the first display region and the second display region of the foldable screen and causing an illusion to the user that two same applications are installed on the mobile phone, the mobile phone may display, in the second display region, any icon such as "a recently run application", "an application that has been used for a large quantity of times", or "an application that has been used for a long time". As shown in FIG. 9C, a second application icon on a second interface 904 is an application that has recently been run on the mobile phone.

In a third implementation, the second interface may alternatively be an interface for an application that has recently been run on the mobile phone. The mobile phone may have recently run one or more applications. If the mobile phone has recently run a plurality of applications, the second interface may be an interface of any one of the plurality of applications, or the second interface may be an interface for an application that has been run for a longest time among the plurality of applications, or the second interface may be an interface for an application that has been run at a time closest to a current time among the plurality of applications.

Figure 10A:
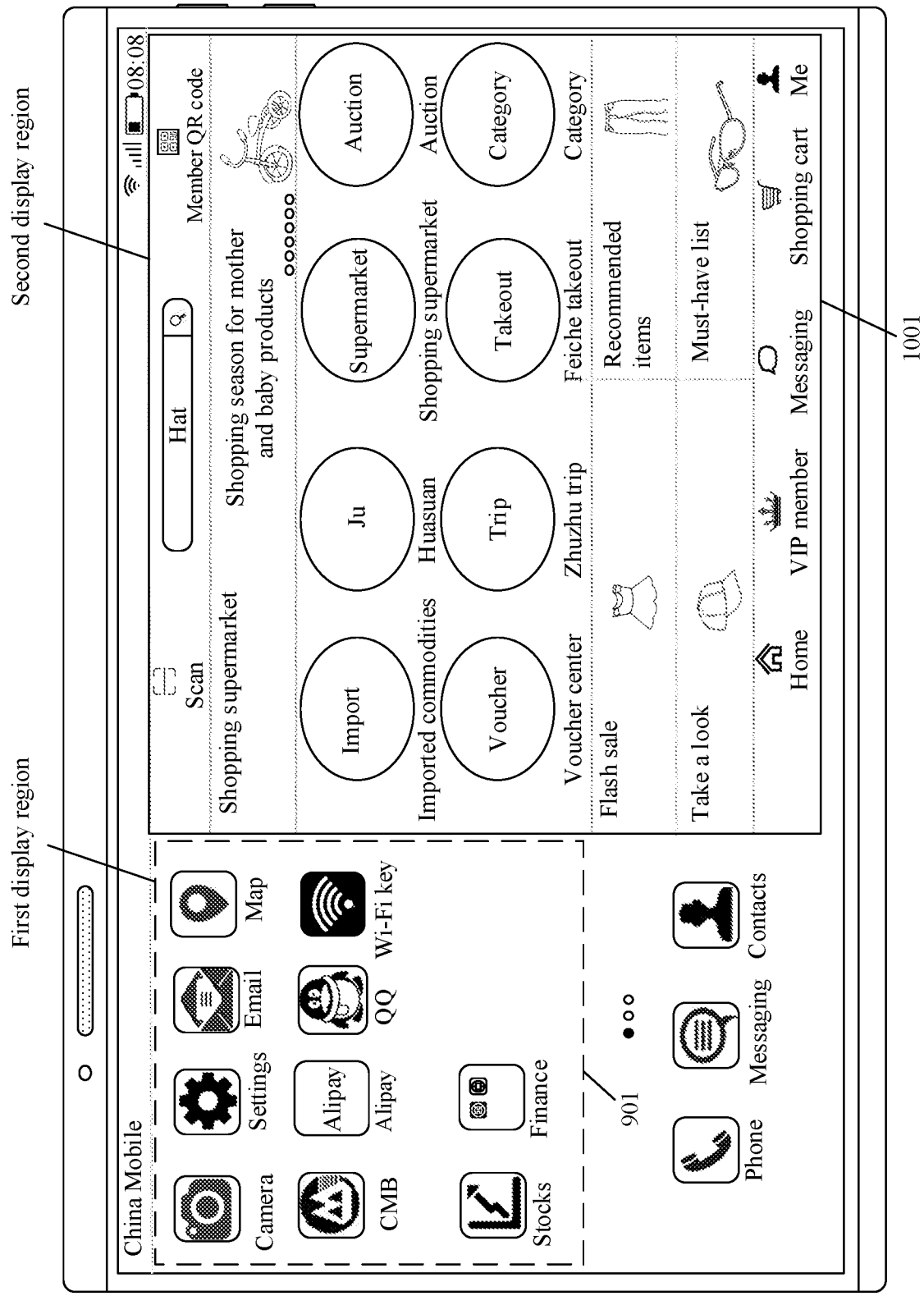
FIG. 10A is a schematic diagram of another example of an application interface displayed on a foldable screen according to an embodiment of this application.

For example, when the mobile phone is in the folded state, an application that has recently been run is a shopping application. It is assumed that, when the mobile phone is in the folded state, a first interface 901 shown in FIG. 9A(a) is displayed. In response to a change of the mobile phone from the folded state to the unfolded state, as shown in FIG. 10A, the mobile phone may display the first interface 901 in the first display region of the foldable screen, and display a second interface 1001 in the second display region. The second interface 1001 is an interface of the shopping application.

Figure 10B:
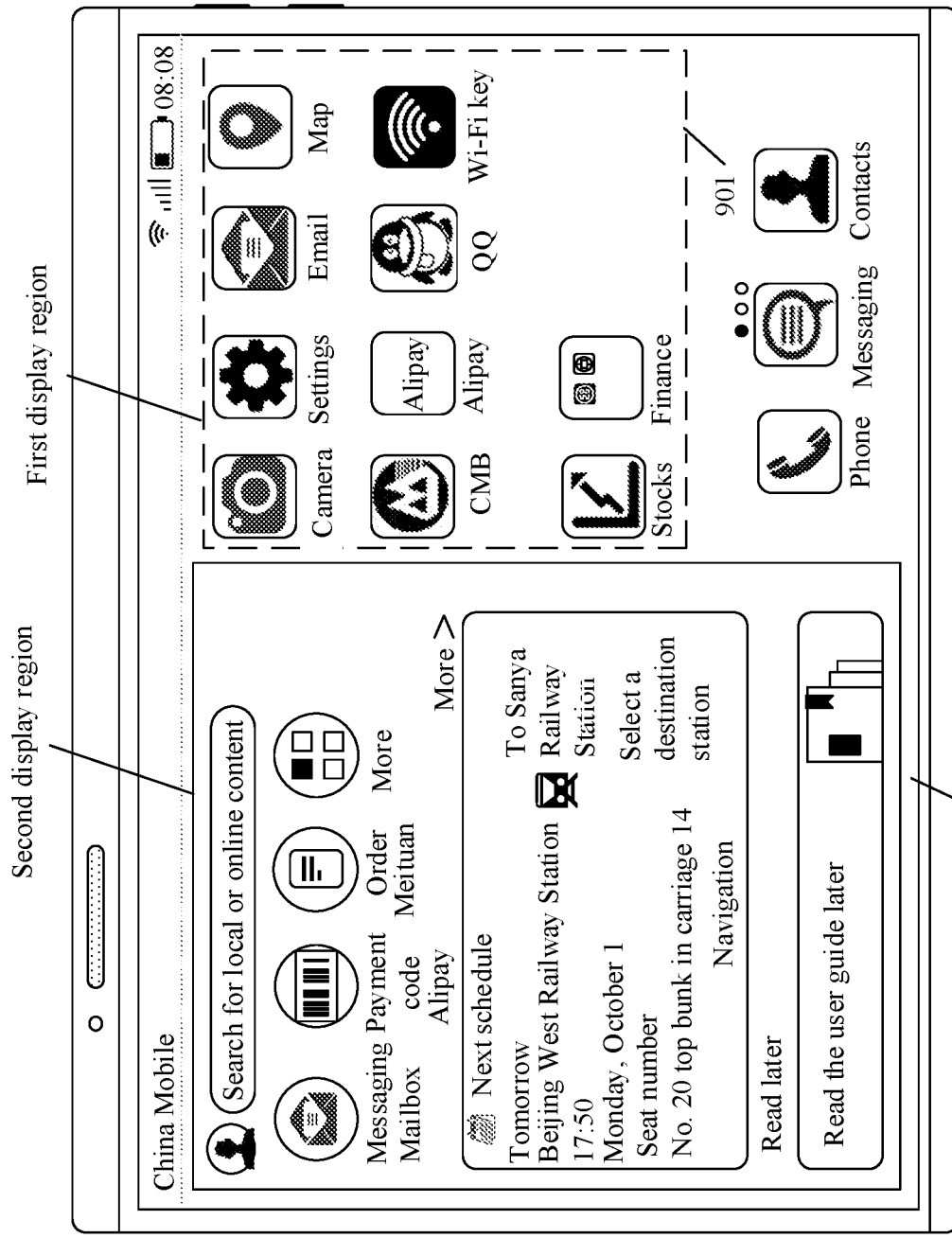
FIG. 10B is a schematic diagram of another example of an application interface displayed on a foldable screen according to an embodiment of this application.

In this implementation, for example, the first display region is located on the right side of the foldable screen, the second display region is located on the left side of the foldable screen, and the sizes of the first display region and the second display region are the same. In a fourth implementation, the second interface may be a leftmost screen. For example, when the mobile phone is in the folded state, a main interface displayed on the main screen is a main interface shown in FIG. 9A(a). After the mobile phone changes from the folded state to the unfolded state, an interface displayed on the mobile phone is shown in FIG. 10B. The first display region of the mobile phone is located on the right side of the screen and displays a first interface 901. The second display region of the mobile phone is located on the left side of the screen and displays a leftmost screen 1002.

The leftmost screen of the mobile phone is an interface accessed by the user by swiping right from the main interface displayed on the mobile phone. The interface may display a function and an application that are frequently used by the user, a service and information that the user subscribes to, and the like. The leftmost screen may also be referred to as a desktop assistant, a shortcut menu, or the like.

It can be understood that locations and the sizes of the first display region and the second display region are not specifically limited in this implementation. The leftmost screen is usually an interface accessed by the user by swiping right, and the leftmost screen is on the left of the main interface. In this implementation, to better adapt to an operation habit of the user, the second display region is set to be located on the left side of the foldable screen, and the second interface is displayed in the second display region, where the second interface is a leftmost screen.

Figure 10C:
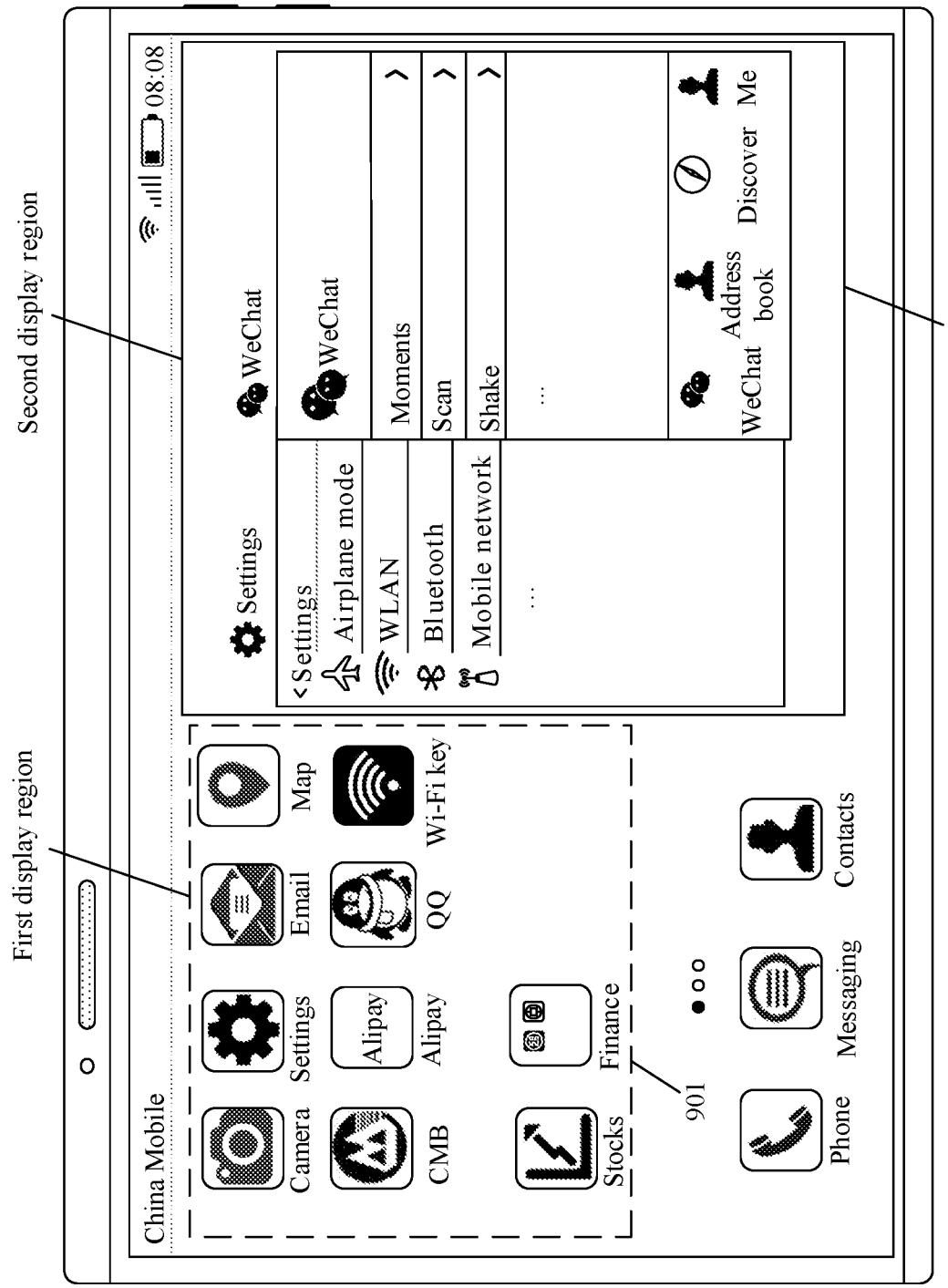
FIG. 10C is a schematic diagram of another example of an application interface displayed on a foldable screen according to an embodiment of this application.

In a fifth implementation, content included in the second interface is user-defined. The second interface may be an interface used to display user-defined prompt information, for example, a calendar, a schedule, or an alarm clock; or may be an interface for a fixed application, for example, the second interface always displays an interface of a mailbox, an interface of a stock application, or an interface of a communication application (such as QQ or WeChat); or may be an interface used to display a function of a mobile phone, for example, an interface displaying a function of a background application. This is not specifically limited. For example, when the mobile phone is in the folded state, a main interface displayed on the main screen is a main interface shown in FIG. 9A(a). After the mobile phone changes from the folded state to the unfolded state, an interface displayed on the mobile phone is shown in FIG. 10C. The first display region of the mobile phone is located on the left side of the foldable screen, and displays a first interface 901. The second interface is indicated by 1003. For example, the second interface is an interface for displaying a background application.

In this implementation, a display available when the mobile phone is in the unfolded state is larger than that available when the mobile phone is in the folded state. For an incremental display area, the user may set display content, or preset content may be displayed, to provide more display content for the user, and improve the user's impression on the mobile phone with the foldable screen.

When the mobile phone is in the folded state and the first interface (that is, the main interface of the mobile phone) is displayed, the main interface of the mobile phone may be switched and displayed in response to a swiping operation of the user (for example, an operation of swiping right on the screen or an operation of swiping left on the screen). In this embodiment of this application, when the mobile phone is in the unfolded state, the main interface of the mobile phone may also be switched and displayed in response to a swiping operation of the user.

In an implementation, for example, the first display region is located on the left side of the foldable screen, and the second display region is located on the right side of the foldable screen. After step 702, the method in this embodiment of this application may further include: In response to a first swiping operation (for example, an operation of swiping left on the screen), the mobile phone displays the second interface in the first display region, and displays a third interface in the second display region. The third interface may be another main interface of the mobile phone, and the third interface is different from the first interface; or the third interface is a leftmost screen of the mobile phone.

Figure 11A:
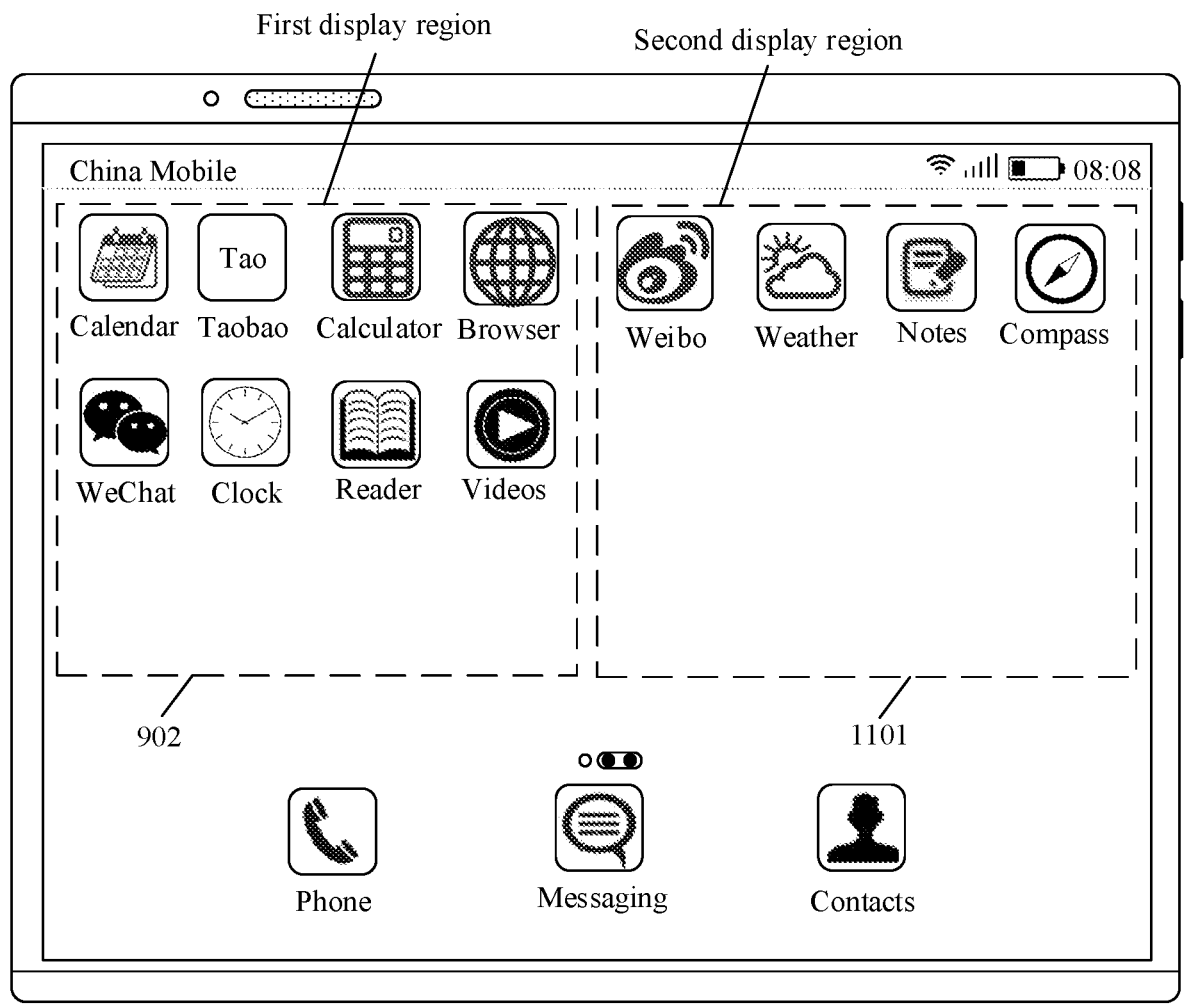
FIG. 11A is a schematic diagram of another example of an application interface displayed on a foldable screen according to an embodiment of this application.

For example, as shown in FIG. 9A(b), it is assumed that, when the mobile phone is in the unfolded state, a first interface 901 is displayed in the first display region of the foldable screen, and a second interface 902 is displayed in the second display region. In response to a first swiping operation (for example, an operation of swiping left on the screen) performed by the user on the foldable screen shown in FIG. 9A(b), as shown in FIG. 11A, the mobile phone may display the second interface 902 in the first display region, and display a third interface 1101 (that is, the main interface 203 shown in FIG. 8(c)) in the second display region.

For example, in response to a second swiping operation (for example, an operation of swiping right on the screen), the mobile phone displays a third interface in the first display region, and displays the second interface in the second display region. The third interface may be another main interface of the mobile phone, and the third interface is different from the first interface; or the third interface is a leftmost screen of the mobile phone.

Figure 11B:
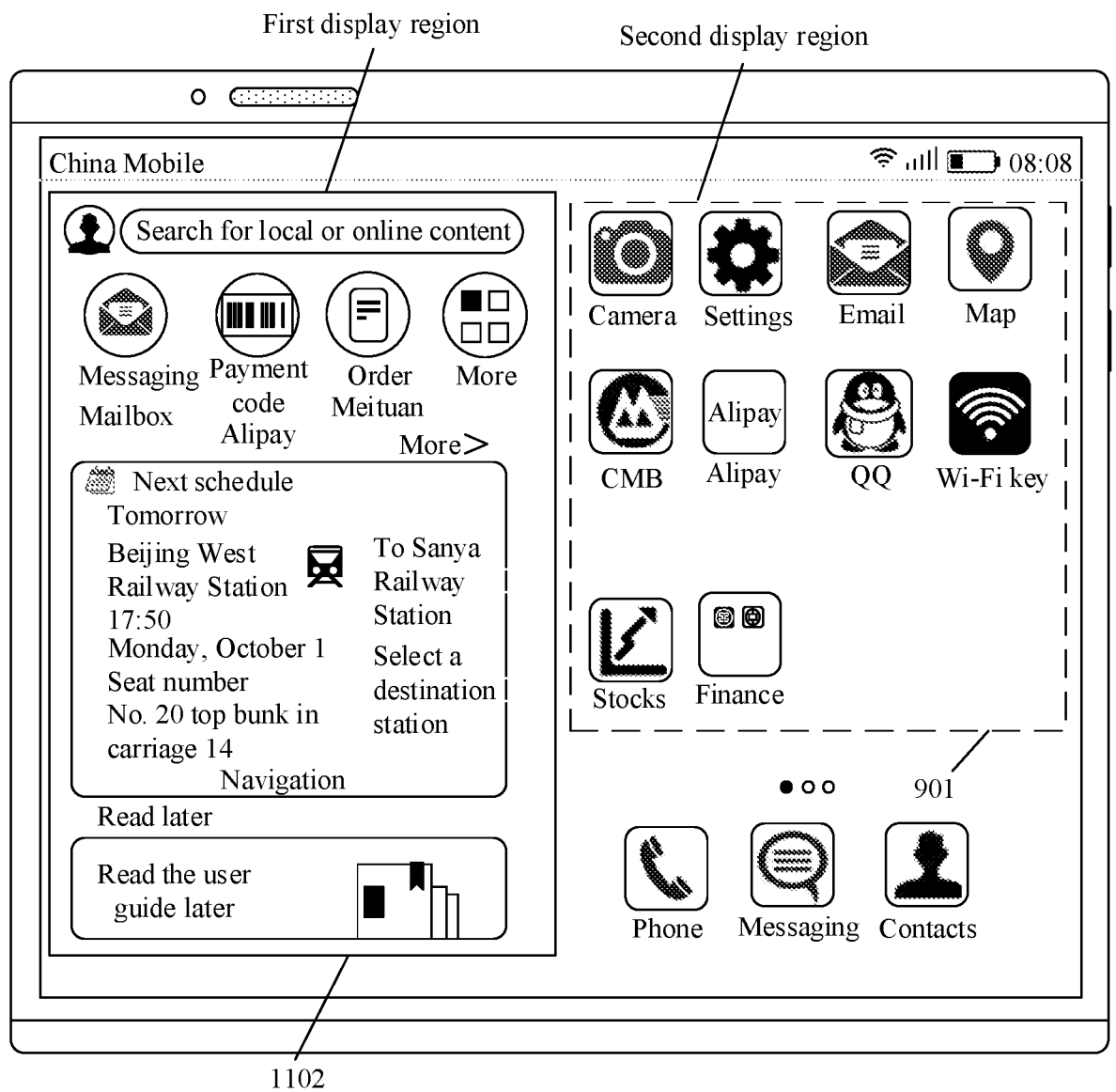
FIG. 11B is a schematic diagram of another example of an application interface displayed on a foldable screen according to an embodiment of this application.

For example, as shown in FIG. 9A(b), it is assumed that, when the mobile phone is in the unfolded state, a first interface 901 is displayed in the first display region of the foldable screen, and a second interface 902 is displayed in the second display region. In response to a second swiping operation (for example, an operation of swiping right on the screen) performed by the user on the foldable screen shown in FIG. 9A(b), as shown in FIG. 11B, the mobile phone may display a third interface 1102, that is, a leftmost screen, in the first display region, and display a second main interface 901 in the second display region.

In another implementation, for example, the first display region is located on the right side of the foldable screen, and the second display region is located on the left side of the foldable screen. After step 702, the method in this embodiment of this application may further include: In response to a first swiping operation (for example, an operation of swiping left on the screen), the mobile phone displays a third interface in the first display region, and displays the first interface in the second display region. The third interface may be another main interface of the mobile phone, and the third interface is different from the first interface; or the third interface is a leftmost screen.

For example, in response to a second swiping operation (for example, an operation of swiping right on the screen), the mobile phone displays the second interface in the first display region, and displays a third interface in the second display region. The third interface may be another main interface of the mobile phone, and the third interface is different from the first interface; or the third interface is a leftmost screen of the mobile phone.

Generally, when the mobile phone is in the folded state, a first page control may be displayed on the main screen of the mobile phone. As shown in FIG. 8(a), FIG. 8(b), and FIG. 8(c), the mobile phone may display a first page control 207 on the main screen. The first page control 207 is used to indicate that the mobile phone is currently displaying one main interface of the mobile phone. The first page control may include one or more main interface indicators. Each main interface indicator corresponds to one main interface of the mobile phone. When the mobile phone displays one main interface, in the first page control, a main interface indicator corresponding to the main interface is different from another main interface indicator. For example, as shown in FIG. 8(b), the first page control 207 includes three main interface indicators, that is, circular indicators. From left to right in the first page control 207, the $1^{st}$ circular indicator corresponds to the main interface 201 shown in FIG. 8(a), the $2^{nd}$ circular indicator corresponds to the main interface 202 shown in FIG. 8(b), and the $3^{nd}$ circular indicator corresponds to the main interface 203 shown in FIG. 8(c). As shown in FIG. 8(b), the mobile phone is currently displaying the main interface 202. The $2^{nd}$ circular indicator in the first page control 207 is highlighted, and is different from the other two circular indicators.

In this embodiment of this application, when the mobile phone is in the folded state, one main interface is displayed in the first display region of the foldable screen, and another main interface is displayed in the second display region, the mobile phone may display a second page control on the foldable screen. The second page control includes one or more main interface indicators, and the second page control is used to indicate two main interfaces currently displayed on the mobile phone. As shown in FIG. 9A(b), the mobile phone displays a second page control 905. The second page control 905 may include a plurality of main interface indicators. Each main interface indicator corresponds to one main interface of the mobile phone. When the mobile phone displays two main interfaces, in the second page control 905, main interface indicators corresponding to the two main interfaces are different from another main interface indicator. Alternatively, when the mobile phone displays two main interfaces, in the second page control 905, main interface indicators corresponding to the two main interfaces are enclosed by an elliptic pattern. Alternatively, when the mobile phone displays two main interfaces, in the second page control 905, main interface indicators corresponding to the two main interfaces are different from another main interface indicator and are enclosed by an elliptic pattern. For example, as shown in FIG. 9A(b), the mobile phone is currently displaying a main interface 901 and a main interface 902, the $1^{st}$ circular indicator and the $2^{nd}$ circular indicator in the second page control 905 are highlighted and different from the $3^{rd}$ circular indicator, and the circular indicators highlighted are enclosed by an elliptic pattern.

In this embodiment of this application, when the first interface includes one or more first application icons, and the second interface includes one or more second application icons, in a process in which the mobile phone changes from the folded state to the unfolded state, the foldable screen of the mobile phone may display animations in which the application icons appear column by column.

It should be noted that, in this application, the method in this embodiment of this application is described by using an example in which the mobile phone is in the folded state when an included angle α between the first screen and the second screen is equal to 0°, and the mobile phone is in the unfolded state when the included angle α between the first screen and the second screen is equal to 180°. When an angle of the mobile phone is (0°, 180°), it indicates that the mobile phone is in an unfolding process or a folding process. A process in which the included angle between the first screen and the second screen of the mobile phone gradually increases from 0° to 180° is referred to as the unfolding process of the mobile phone. A process in which the included angle between the first screen and the second screen of the mobile phone gradually decreases from 180° to 0° is referred to as the folding process of the mobile phone.

For the outward-foldable mobile phone, when the mobile phone is in the folded state, the first screen or the second screen of the mobile phone serves as the main screen and displays the first interface. In this case, when the mobile phone is in the folded state or the unfolded state, the foldable screen is visible to the user. The method in this embodiment of this application may further include: When the mobile phone is in the unfolding process, the mobile phone displays, in the second display region, animations in which the one or more second application icons appear column by column.

Figure 12A:
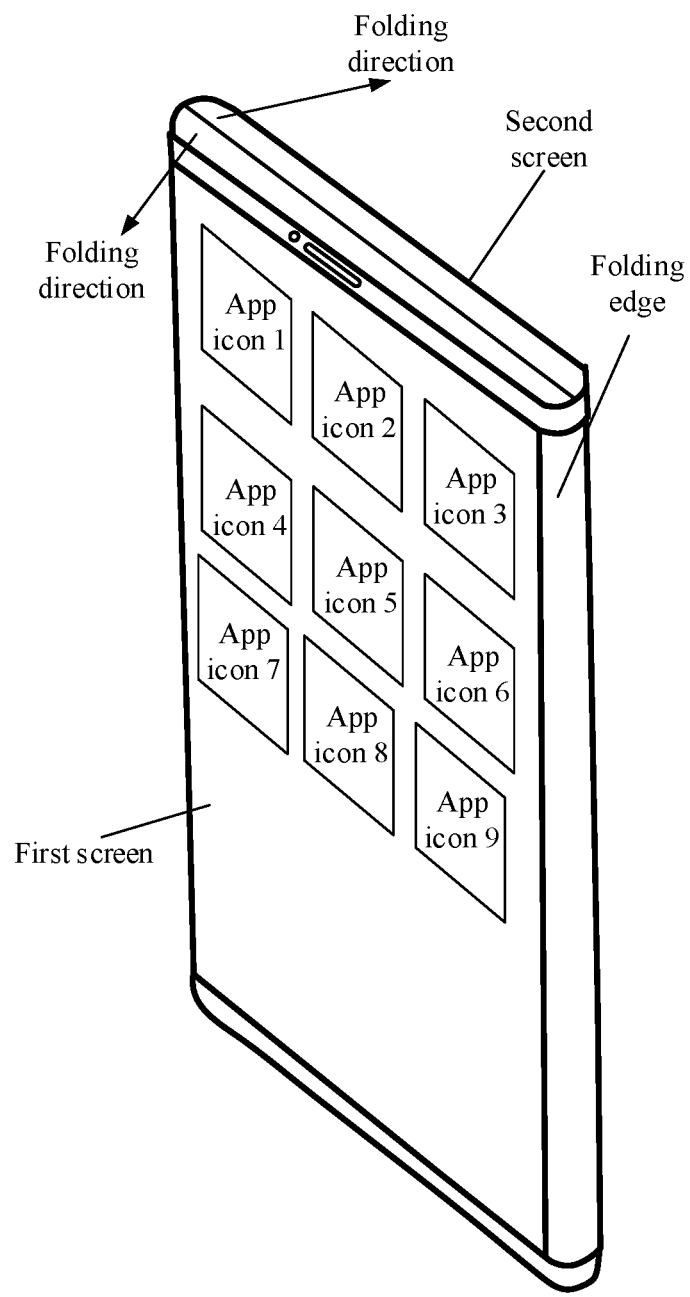
FIG. 12(a), FIG. 12(b), FIG. 12(c), and FIG. 12(d) are a schematic diagram of display interfaces of a mobile phone with a foldable screen according to an embodiment of this application.
Figure 12B:
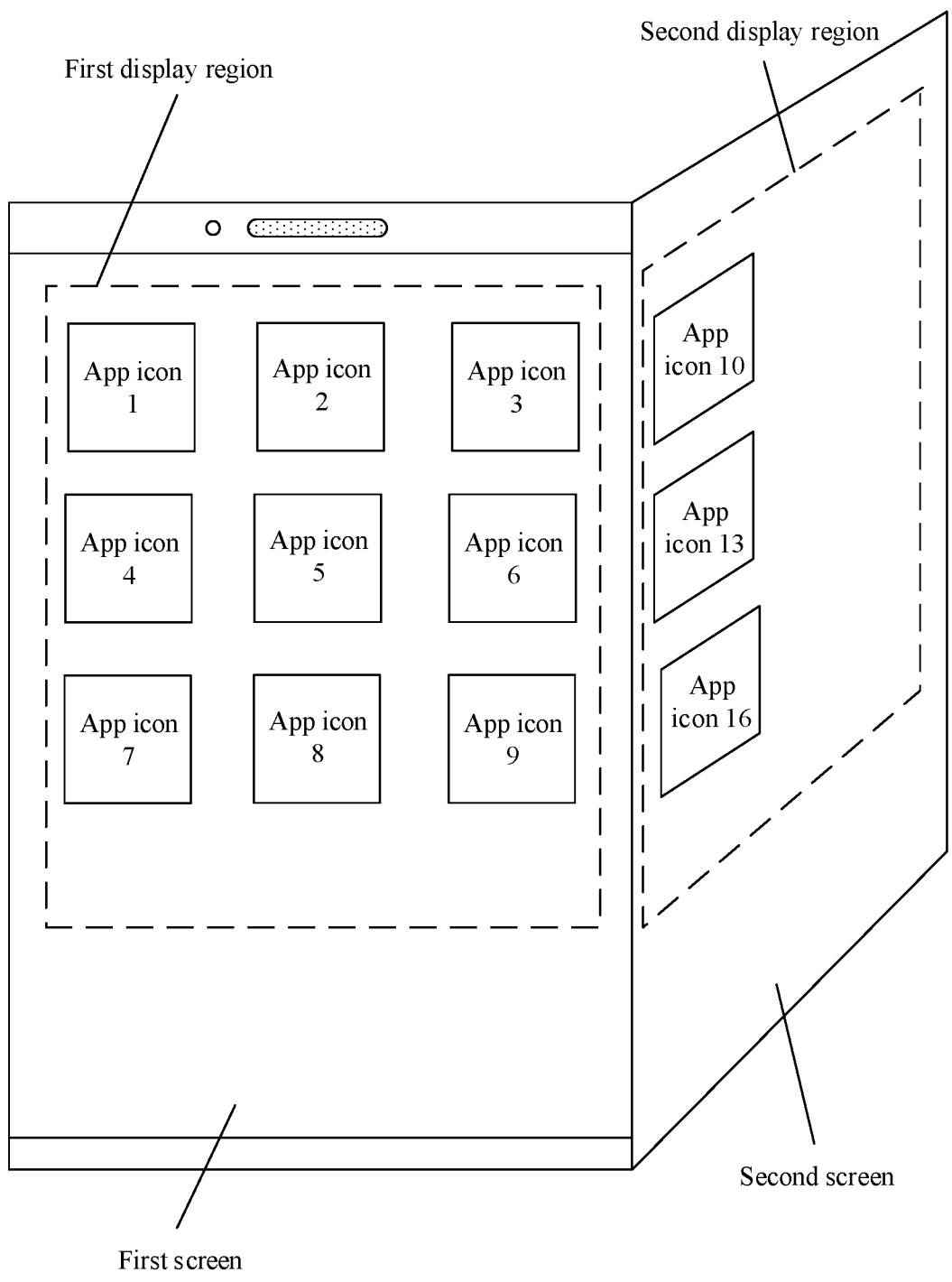
Figure 12C:
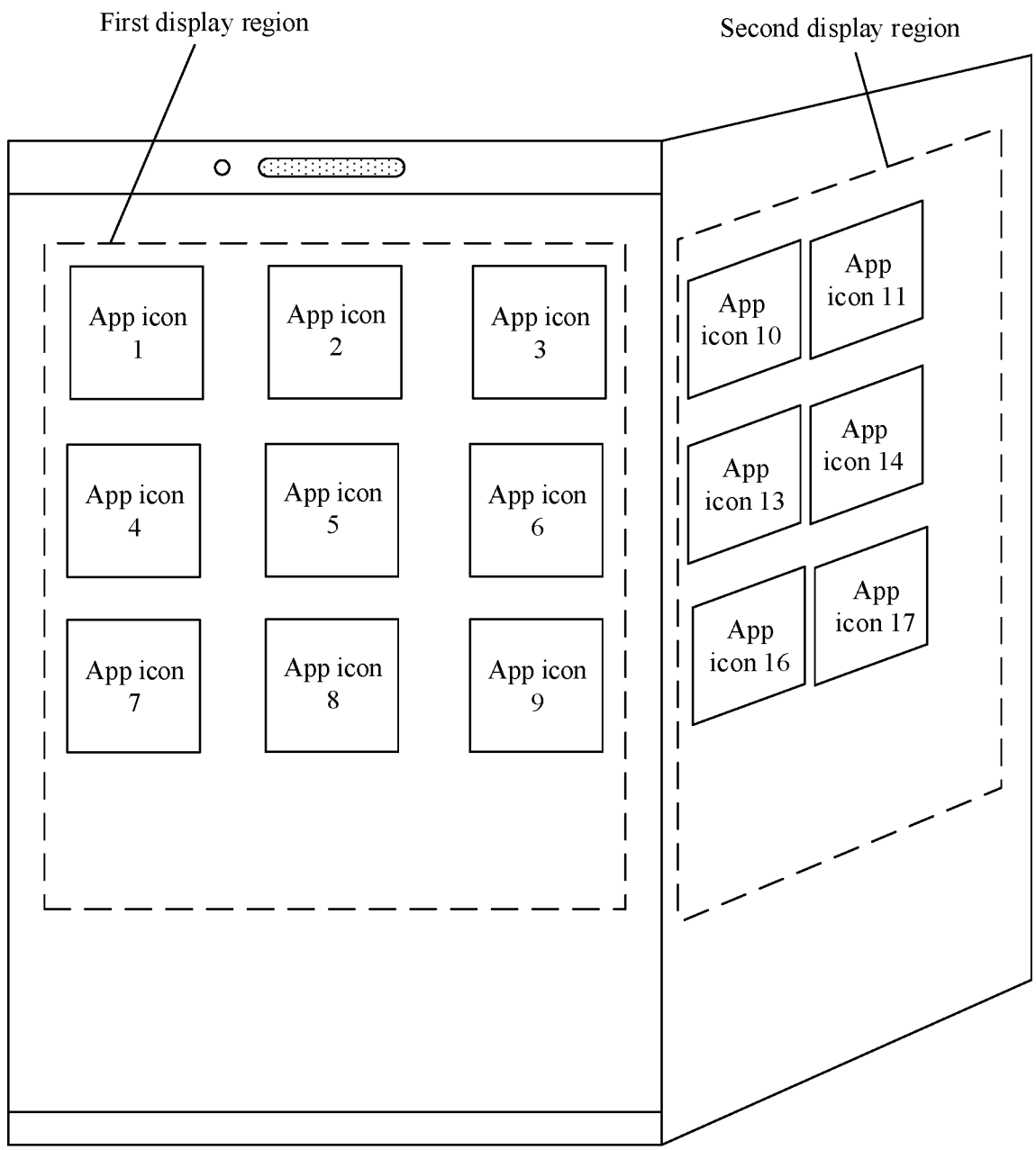
Figure 12D:
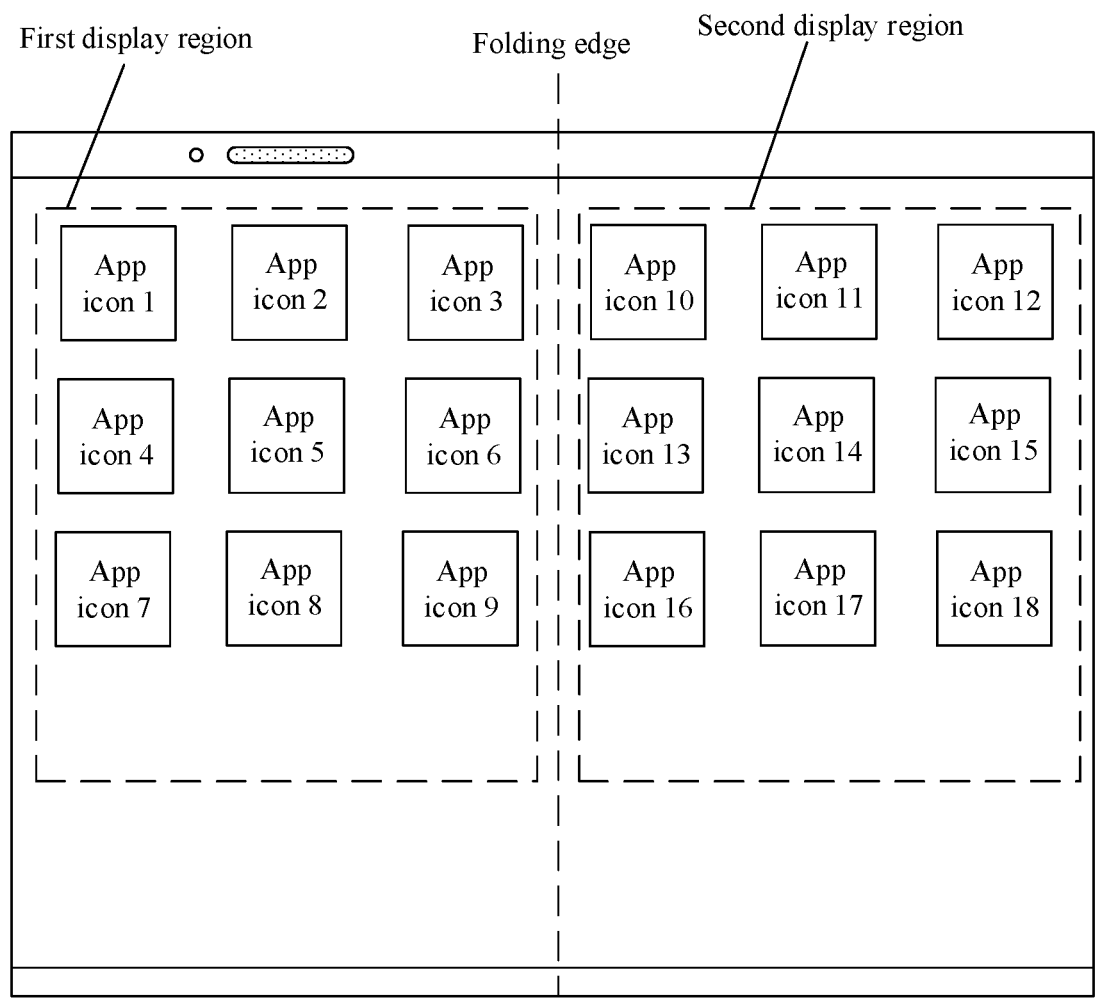

For example, as shown in FIG. 12(a), when the mobile phone is in the folded state, the first interface is displayed on the first screen, and the second screen may be off. The first screen serves as the first display region, and the second screen serves as the second display region. The first interface includes a plurality of first application icons, for example, an app icon 1 to an app icon 9 in FIG. 12(a). In response to a change of the mobile phone from the folded state to the unfolded state, as shown in FIG. 12(b), FIG. 12(c), and FIG. 12(d), the mobile phone may display, in the second display region, animations in which the one or more second application icons appear column by column. As shown in FIG. 12(b), when the angle between the first screen and the second screen of the mobile phone is a first preset angle, the second screen of the mobile phone displays the $1^{st}$ column of application icons on the second interface, for example, an app icon 10, an app icon 13, and an app icon 16 shown in FIG. 12(b). When the angle between the first screen and the second screen of the mobile phone is a second preset angle, the second screen of the mobile phone displays the $1^{st}$ and the $2^{nd}$ columns of application icons on the second interface. An app icon 11, an app icon 14, and an app icon 17 are further displayed in FIG. 12(b), as shown in FIG. 12(c). When the mobile phone is in the unfolded state, the second screen of the mobile phone displays all three columns of application icons on the second interface, as shown in FIG. 12(d). In a process in which the mobile phone changes from the folded state to the unfolded state, an image displayed on the foldable screen of the mobile phone switches from FIG. 12(a) to FIG. 12(b), switches from FIG. 12(b) to FIG. 12(c), and switches from FIG. 12(c) to FIG. 12(d).

For example, when the mobile phone is in the folding process, the mobile phone displays, in the first display region, animations in which the plurality of first application icons disappear column by column, or displays, in the second display region, animations in which the plurality of second application icons disappear column by column.

For example, as shown in FIG. 12(a), when the mobile phone is in the folded state, the first screen serves as the main screen. When the mobile phone is in the folding process, the animations displayed on the mobile phone may switch from FIG. 12(d) to FIG. 12(c), switch from FIG. 12(c) to FIG. 12(b), and switch from FIG. 12(b) to FIG. 12(a), as shown in FIG. 12(a), FIG. 12(b), FIG. 12(c), and FIG. 12(d). The main screen of the mobile phone in the folded state shown in FIG. 12(a) may alternatively display a lock screen interface or an interface for an application that is last run on the mobile phone. This is merely an example.

It can be understood that, if content displayed on the main screen remains unchanged in the folding process of the mobile phone, a screen on a side with a front-facing camera may be the main screen by default, or it is determined, by using camera data and data of a related sensor of the mobile phone, that a user-facing screen is the main screen.

It should be noted that only the animations that appear column by column are used herein to represent a screen display change process when the mobile phone changes from the folded state to the unfolded state. In practice, another manner with animations may alternatively be used to represent a screen change. For example, the second screen displays the second interface through screen gradients, or the second interface appears in ascending order of screen resolutions, or the second interface is gradually displayed through scrolling of a roller shaft. This is merely an example and is not specifically limited herein.

It can be understood that, in this implementation, an example in which the mobile phone is an outward-foldable mobile phone is used for description. When the mobile phone is an inward-foldable mobile phone, content on a screen may also be displayed by using animations.

For example, for an inward-foldable mobile phone, the mobile phone includes a third screen for serving as the main screen and displaying the first interface. In this case, when the mobile phone is in the folded state, the foldable screen is invisible to the user. The method in this embodiment of this application may further include: when the mobile phone is in the unfolding process, displaying, in the first display region of the mobile phone, animations in which the plurality of first application icons appear column by column, and displaying, in the second display region, animations in which the one or more application icons appear column by column.

Figure 13A:
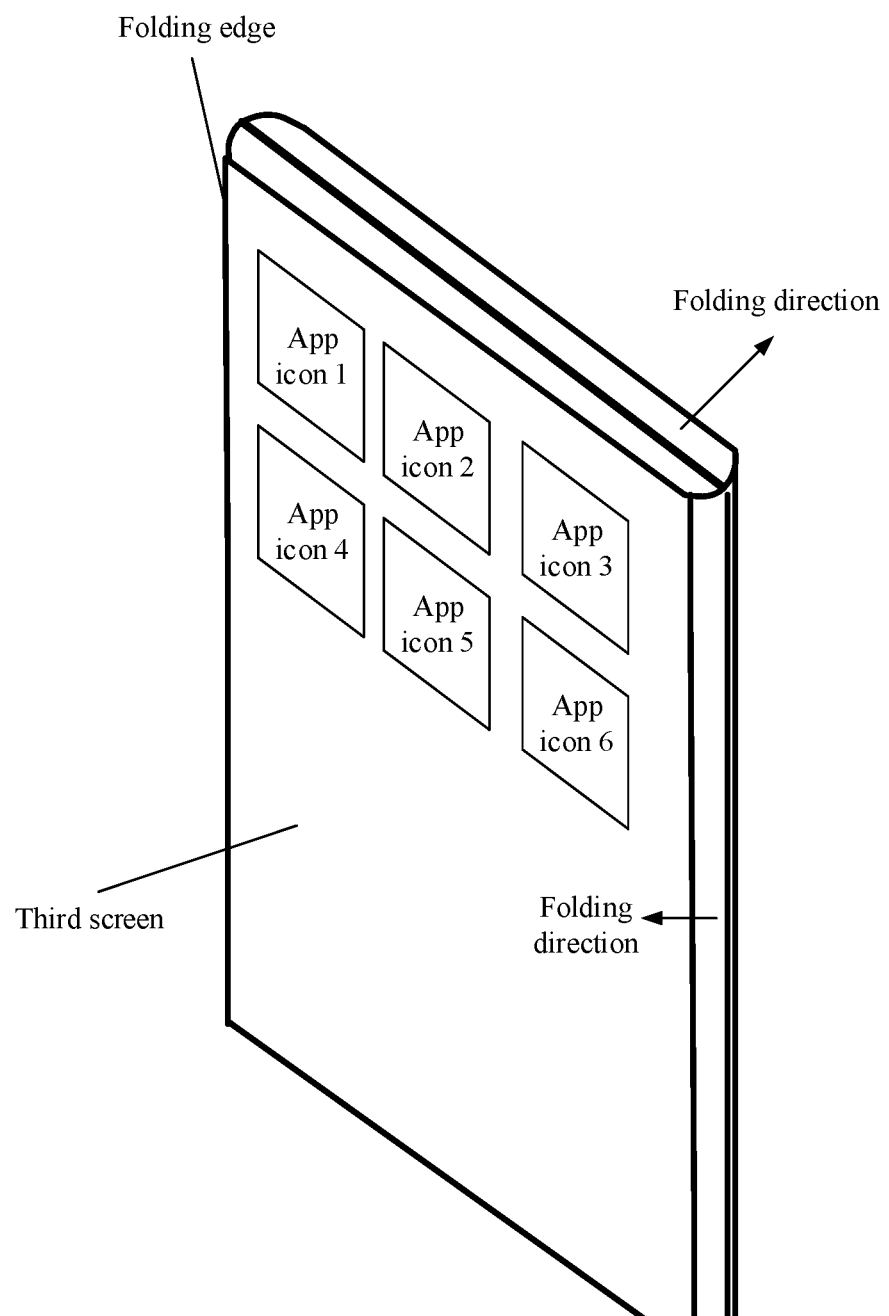
FIG. 13(a), FIG. 13(b), FIG. 13(c), and FIG. 13(d) are a schematic diagram of other display interfaces of a mobile phone with a foldable screen according to an embodiment of this application.
Figure 13B:
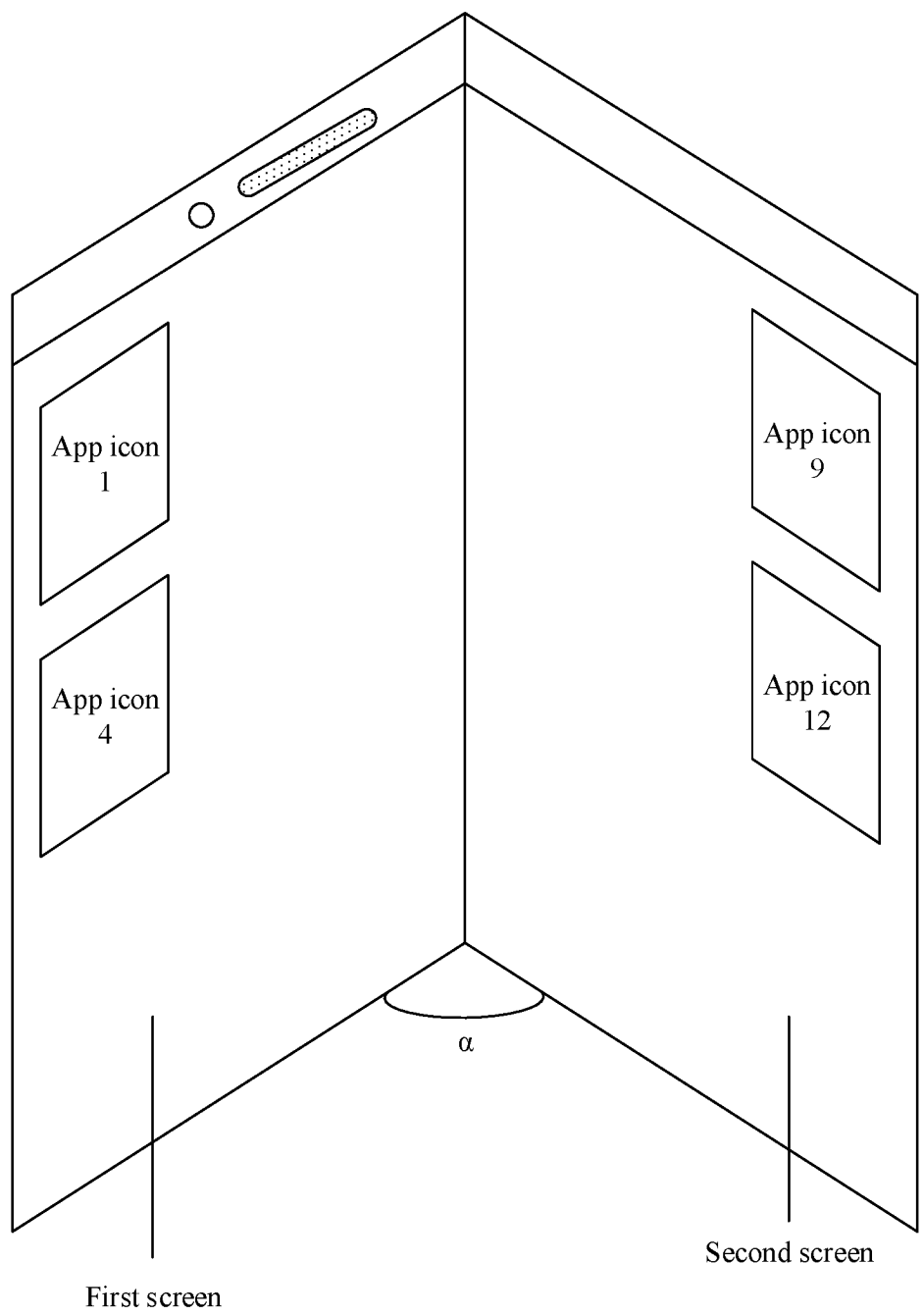
Figure 13C:
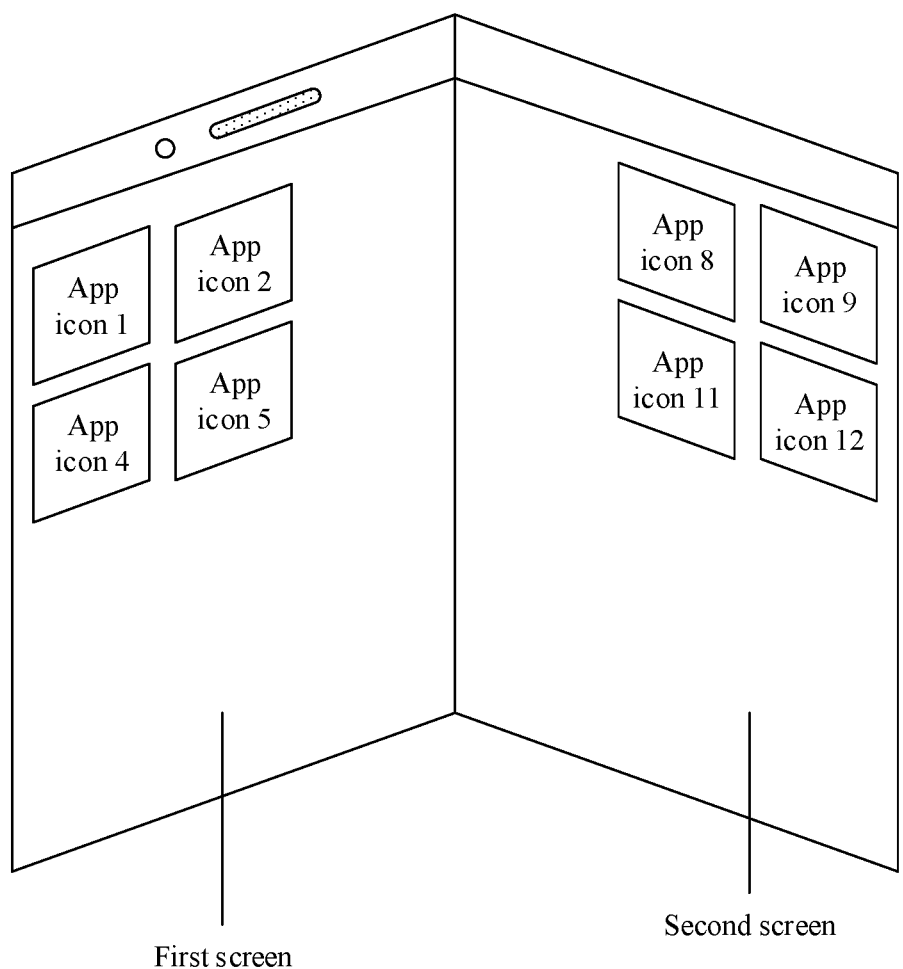
Figure 13D:
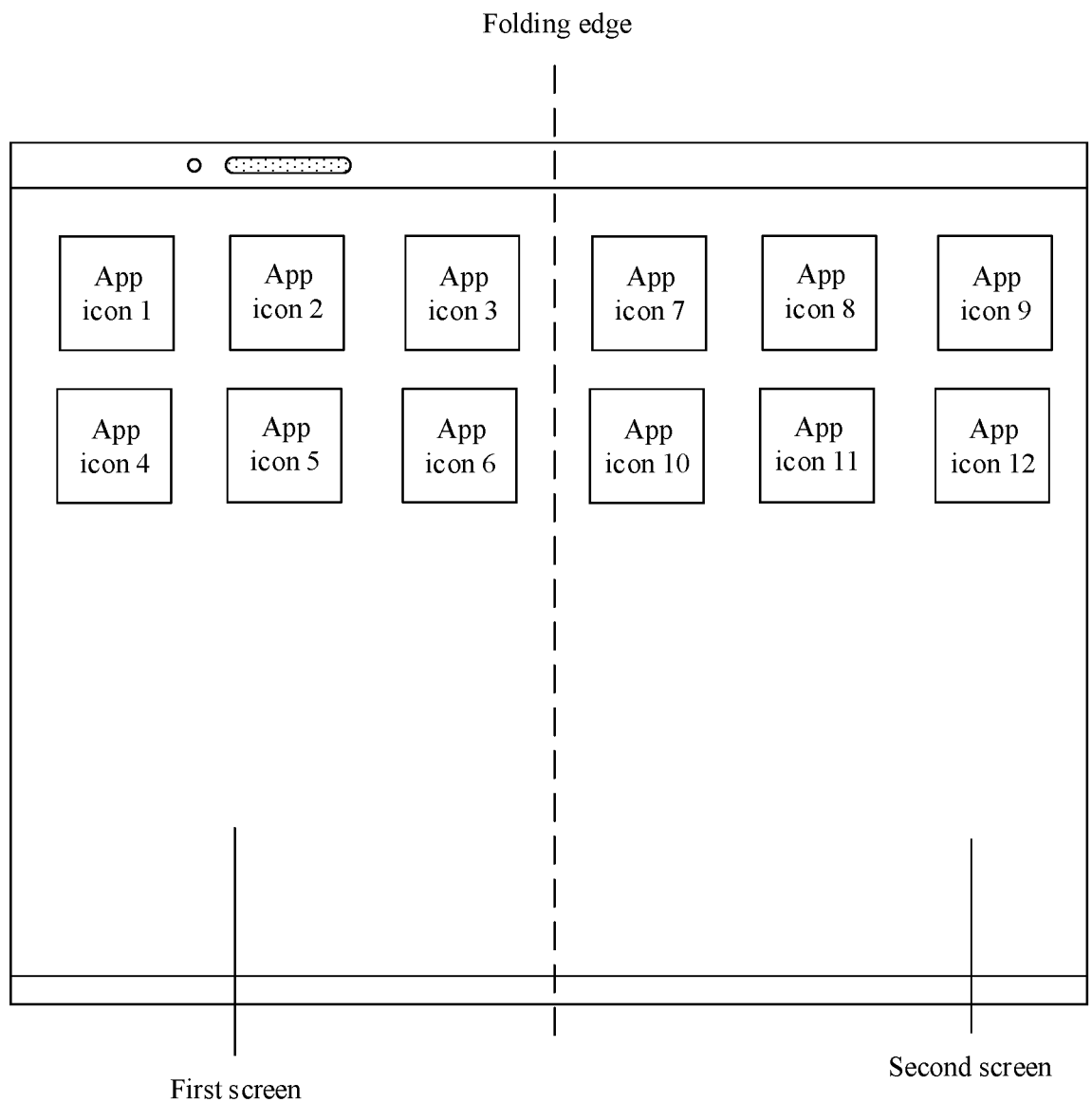

For example, as shown in FIG. 13(a), when the mobile phone is in the folded state, the first interface is displayed on the third screen. When the mobile phone is in the unfolded state, the first screen displays the first interface, and the second screen displays the second interface. In response to the unfolding process and the folding process of the mobile phone, as shown in FIG. 13(b), FIG. 13(c), and FIG. 13(d), the mobile phone may display animations in which application icons on the first interface and application icons on the second interface appear column by column. FIG. 13(b) indicates that the first screen of the foldable screen of the mobile phone displays the $1^{st}$ column of application icons on the first interface, and the second screen of the foldable screen displays the 1st column of application icons on the second interface. FIG. 13(c) indicates that the first screen of the foldable screen of the mobile phone displays the 1st and the 2nd columns of application icons on the first interface, and the second screen of the foldable screen displays the 1st and the 2nd columns of application icons on the second interface. FIG. 13(d) indicates that the first screen of the foldable screen of the mobile phone displays the first interface, and the second screen displays the second interface. In a process in which the mobile phone changes from the folded state to the unfolded state, an image displayed on the foldable screen of the mobile phone switches from FIG. 13(a) to FIG. 13(b), switches from FIG. 13(b) to FIG. 13(c), and switches from FIG. 13(c) to FIG. 13(d).

For example, when the mobile phone is in the folding process, the mobile phone displays, in the first display region, animations in which the plurality of first application icons appear column by column, and displays, in the second display region, animations in which the one or more second application icons appear column by column.

For example, as shown in FIG. 13(a), when the mobile phone is in the folded state, the third screen serves as the main screen. When the mobile phone is in the folding process, the animations displayed on the mobile phone may switch from FIG. 13(d) to FIG. 13(c), switch from FIG. 13(c) to FIG. 13(b), and switch from FIG. 13(b) to FIG. 13(a), as shown in FIG. 13(a), FIG. 13(b), FIG. 13(c), and FIG. 13(d). The main screen of the mobile phone in the folded state shown in FIG. 13(a) may alternatively display a lock screen interface or an interface for an application that is last run on the mobile phone. This is merely an example.

Some other embodiments of this application provide an electronic device. The electronic device may include a foldable screen, a memory, and one or more processors. The foldable screen, the memory, and the processor are coupled to each other. The memory is configured to store computer program code, where the computer program code includes computer instructions. When the processor executes the computer instructions, the electronic device may perform the functions or the steps performed by the mobile phone in the foregoing method embodiment. For a structure of the electronic device, refer to the structure of the electronic device 100 shown in FIG. 4.

Figure 14:
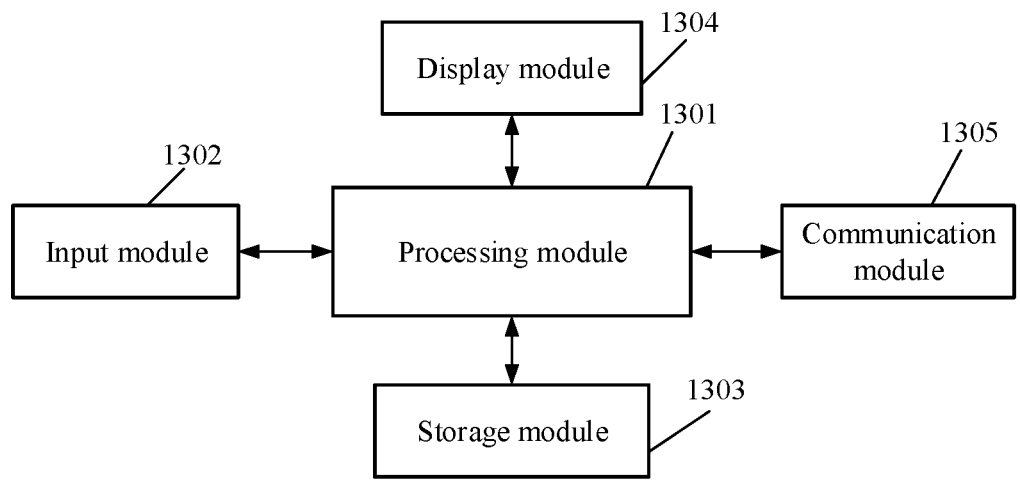
FIG. 14 is a schematic diagram of a structure of an electronic device according to an embodiment of this application.

A core structure of the electronic device may be represented as a structure shown in FIG. 14. The electronic device includes a processing module 1301, an input module 1302, a storage module 1303, a display module 1304, and a communication module 1305.

The processing module 1301 may include at least one of a central processing unit (CPU), an application processor (AP), or a communication processor (CP). The processing module 1301 may perform an operation or data processing related to control and/or communication of at least one of other elements of the electronic device. Specifically, the processing module 1301 may be configured to control, based on a specific trigger condition, content displayed on a main screen; or determine, according to a preset rule, content displayed on a screen. The processing module 1301 is further configured to process input instructions or data, and determine a display style based on processed data. The processing module 1301 further includes a rendering engine and the like, to render an interface element UI.

The input module 1302 is configured to obtain an instruction or data entered by a user, and transmit the obtained instructions or data to another module of the electronic device. Specifically, an input mode of the input module 1302 may include a touch, a gesture, proximity to a screen, or the like, or may be voice input. For example, the input module may be a screen of the electronic device, and may obtain an input operation of the user, generate an input signal based on the obtained input operation, and transmit the input signal to the processing module 1301.

The storage module 1303 may include a volatile memory and/or a non-volatile memory. The storage module is configured to store instructions or data related to at least one of other modules of the user terminal device. Specifically, the storage module may record a location of an interface on which a terminal interface element UI is located.

The display module 1304 may include, for example, a liquid crystal display (LCD), a light-emitting diode (LED) display, an organic light-emitting diode (OLED) display, a micro-electro-mechanical system (MEMS) display, or an electronic paper display, and is configured to display user-visible content (for example, texts, images, videos, icons, and symbols).

The communication module 1305 is configured to support a personal terminal in communicating with another personal terminal (through a communication network). For example, the communication module may be connected to a network through wireless communication or wired communication, to communicate with another personal terminal or a network server. The wireless communication may use at least one of cellular communication protocols, such as long term evolution (LTE), long term evolution advanced (LTE-A), code division multiple access (CDMA), wideband code division multiple access (WCDMA), universal mobile telecommunications system (UMTS), wireless broadband (WiBro), or a global system for mobile communications (GSM). The wireless communication may include, for example, short-range communication. The short-range communication may include at least one of wireless fidelity (Wi-Fi), Bluetooth, near field communication (NFC), magnetic stripe transmission (MST), or GNSS.

Some other embodiments of this application provide a display apparatus. The apparatus may be used for the foregoing electronic device including a touchscreen. The apparatus is configured to perform the functions or the steps performed by the mobile phone in the foregoing method embodiment.

Figure 15:
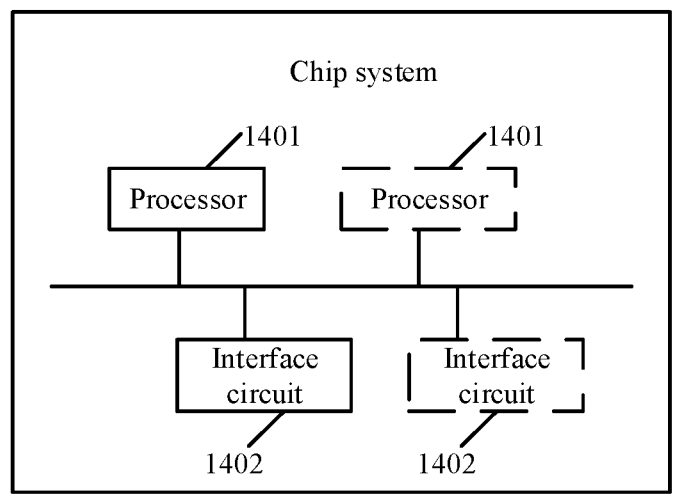
FIG. 15 is a schematic diagram of a structure of a chip system according to an embodiment of this application.

An embodiment of this application further provides a chip system. As shown in FIG. 15, the chip system includes at least one processor 1401 and at least one interface circuit 1402. The processor 1401 and the interface circuit 1402 may be connected to each other through a line. For example, the interface circuit 1402 may be configured to receive a signal from another apparatus (for example, a memory of the electronic device). For another example, the interface circuit 1402 may be configured to send a signal to another apparatus (for example, the processor 1401). For example, the interface circuit 1402 may read instructions stored in the memory, and send the instructions to the processor 1401. When the instructions are executed by the processor 1401, the electronic device is enabled to perform the steps in the foregoing embodiment. Certainly, the chip system may further include another discrete device. This is not specifically limited in this embodiment of this application.

An embodiment of this application further provides a computer storage medium. The computer storage medium includes computer instructions. When the computer instructions are run on the foregoing electronic device, the electronic device is enabled to perform the functions or the steps performed by the mobile phone in the foregoing method embodiment.

An embodiment of this application further provides a computer program product. When the computer program product runs on a computer, the computer is enabled to perform the functions or steps performed by the mobile phone in the foregoing method embodiment.

The foregoing descriptions about the implementations allow a person skilled in the art to understand that, for the purpose of convenient and brief description, division into the foregoing functional modules is taken as an example for illustration. In actual application, the foregoing functions can be allocated to different modules for implementation based on requirements, that is, an inner structure of an apparatus is divided into different functional modules to implement all or some of the functions described above.

In the embodiments provided in this application, it should be understood that the disclosed apparatus and method may be implemented in other manners. For example, the described apparatus embodiments are merely examples. For example, division into the modules or units is merely logical function division, and there may be another division manner during actual implementation. For example, a plurality of units or components may be combined, or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed at different places. Some or all of the units may be selected based on actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the steps in the method described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A foldable screen display method, applied to an electronic device comprising a foldable screen, wherein the electronic device is configured to be folded so that the foldable screen is divided into a plurality of display regions, and the method comprises:
    when the electronic device is in a folded state, displaying, by the electronic device, a first interface on a main screen of the electronic device, wherein the first interface is a main interface of the electronic device, and the first interface comprises a plurality of first application icons; and
    in response to a change of the electronic device from the folded state to an unfolded state, displaying, by the electronic device, the first interface in a first display region of the foldable screen, and displaying a second interface in a second display region of the foldable screen, wherein the second interface is different from the first interface,
    wherein the second interface comprises one or more second application icons, wherein the plurality of first application icons are different from the one or more second application icons, wherein the second interface is another main interface of the electronic device, and wherein the first interface of the electronic device is identical in the folded state and in the unfolded state.

2. The method according to claim 1, wherein the one or more second application icons comprise an application icon of an application that has recently been run on the electronic device and that has not been closed.

3. The method according to claim 1, wherein the one or more second application icons comprise one of an application icon of one or more applications that have been used more than a preset quantity of times within a preset period of time, or an application icon of one or more applications that have been used longer than a preset duration within a preset period of time.

4. The method according to claim 1, wherein the second interface is an interface of a recently used application.

5. The method according to claim 1, wherein the second interface is a leftmost screen.

6. The method according to claim 1, wherein content comprised in the second interface is user-defined.

7. The method according to claim 1, wherein the method further comprises:
    when the electronic device is in the folded state, displaying a first page control on the main screen of the electronic device, wherein the first page control is used to indicate that the electronic device is currently displaying one main interface of the electronic device; and
    when the electronic device is in the unfolded state, displaying a second page control on the foldable screen, wherein the second page control is used to indicate that the electronic device is currently displaying two main interfaces of the electronic device.

8. The method according to claim 1, wherein the method further comprises:
    when the electronic device is in the unfolded state, in response to a first swiping operation, displaying, by the electronic device, the second interface in the first display region, and displaying a third interface in the second display region, wherein
    the third interface is one of different from the second interface, and the third interface is another main interface of the electronic device, or is a leftmost screen of the electronic device.

9. The method according to claim 1, wherein the foldable screen is an inward foldable screen; when the electronic device is in the folded state, the foldable screen is not visible to a user; when the electronic device is in the unfolded state, the foldable screen is visible to the user; and the method further comprises:

in a process in which the electronic device changes from the folded state to the unfolded state, displaying, by the electronic device in the first display region, animations in which the plurality of first application icons appear column by column, and displaying, in the second display region, animations in which the one or more second application icons appear column by column.

10. The method according to claim 9, wherein the method further comprises:

in a process in which the electronic device changes from the unfolded state to the folded state, displaying, by the electronic device in the first display region, animations in which the plurality of first application icons disappear column by column, and displaying, in the second display region, animations in which the one or more second application icons disappear column by column.

11. The method according to claim 1, wherein the foldable screen is an outward foldable screen; when the electronic device is in the folded state or the unfolded state, the foldable screen is visible to a user; and the method further comprises:

in a process in which the electronic device changes from the folded state to the unfolded state, displaying, by the electronic device in the second display region, animations in which the one or more second application icons appear column by column.

12. The method according to claim 11, wherein the method further comprises:

in a process in which the electronic device changes from the unfolded state to the folded state, displaying, by the electronic device in the second display region, animations in which the one or more second application icons disappear column by column.

13. An electronic device, wherein the electronic device comprises a foldable screen, and wherein the electronic device is configured to be folded so that the foldable screen is divided into a plurality of display regions, comprising:

a non-transitory memory; and one or more processors, wherein the memory is coupled to the one or more processors, the memory is configured to store a computer program code, the computer program code comprises computer instructions, and when the one or more processors executes the computer instructions, the one or more processors perform steps comprising:

when the electronic device is in a folded state, displaying a first interface on a main screen of the electronic device, wherein the first interface is a main interface of the electronic device, and the first interface comprises a plurality of first application icons; and in response to a change of the electronic device from the folded state to an unfolded state, displaying the first interface in a first display region of the foldable screen, and displaying a second interface in a second display region of the foldable screen, wherein the second interface is different from the first interface, wherein the second interface comprises one or more second application icons, wherein the plurality of first application icons are different from the one or more second application icons, wherein the second interface is another main interface of the electronic device, and wherein the first interface of the electronic device is identical in the folded state and in the unfolded state.

14. A non-transitory computer readable memory storing instructions for performing a method, applied to an electronic device comprising a foldable screen, wherein the electronic device is configured to be folded so that the foldable screen is divided into a plurality of display regions, comprising:

when the electronic device is in a folded state, displaying a first interface on a main screen of the electronic device, wherein the first interface is a main interface of the electronic device, and the first interface comprises a plurality of first application icons; and in response to a change of the electronic device from the folded state to an unfolded state, displaying the first interface in a first display region of the foldable screen, and displaying a second interface in a second display region of the foldable screen, wherein the second interface is different from the first interface, wherein the second interface comprises one or more second application icons, wherein the plurality of first application icons are different from the one or more second application icons, wherein the second interface is another main interface of the electronic device, and wherein the first interface of the electronic device is identical in the folded state and in the unfolded state.

* * * * *